United States Patent
Watanabe

(10) Patent No.: US 8,711,858 B2
(45) Date of Patent: Apr. 29, 2014

(54) PACKET COMMUNICATION SYSTEM AND PACKET COMMUNICATION METHOD, AND NODE AND USER DEVICE

(75) Inventor: Naotoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 559 days.

(21) Appl. No.: 12/785,918

(22) Filed: May 24, 2010

(65) Prior Publication Data

US 2010/0226372 A1    Sep. 9, 2010

Related U.S. Application Data

(63) Continuation of application No. PCT/JP2007/074008, filed on Dec. 13, 2007.

(51) Int. Cl.
*H04L 12/28* (2006.01)
*H04L 12/56* (2006.01)

(52) U.S. Cl.
CPC ..................... *H04L 45/72* (2013.01)
USPC ........................... 370/392; 710/316

(58) Field of Classification Search
USPC ................ 370/392, 331, 328; 455/406, 433
See application file for complete search history.

(56) References Cited

U.S. PATENT DOCUMENTS

| 2003/0115283 | A1 | 6/2003 | Barbir et al. | |
| 2007/0232301 | A1* | 10/2007 | Kueh | 455/433 |
| 2009/0291666 | A1* | 11/2009 | Rydnell et al. | 455/406 |
| 2012/0044908 | A1* | 2/2012 | Spinelli et al. | 370/331 |

FOREIGN PATENT DOCUMENTS

| EP | 1445896 | 8/2004 | | |
| JP | 2003-208371 | 7/2003 | | |
| WO | WO 2009024182 A1 * | 2/1999 | ............. | H04L 29/06 |
| WO | 03/043276 | 5/2003 | | |

OTHER PUBLICATIONS

3GPP TR 23.894 V0.2.0; 3rd Generation Partnership Project; Technical Specification Group Services and System Aspects; System enhancements for the use of IMS Services in local breakout and optimal routing of media; (Release 8); Dated Oct. 2007; [Ref.: ISR mailed Jan. 15, 2008].

3GPP TR 23.882 V1.9.0 (Mar. 2007); 3rd Generation Partnership Project; Technical Specification Group Services and System Aspects; 3GPP System Architecture Evolution: Report on Technical Options and Conclusions; (Release 7); Dated Mar. 2007.

International Search Report for corresponding International Patent Application No. PCT/JP2007/074008, mailed Jan. 15, 2008.

* cited by examiner

*Primary Examiner* — Dang Ton
*Assistant Examiner* — Lionel Preval
(74) *Attorney, Agent, or Firm* — Myers Wolin, LLC

(57) ABSTRACT

A node compares an address resolution result corresponding to first packet data that is sent by the user device for accessing a first content server and an address resolution result corresponding to second packet data having the sender of the first packet data as the local node. When the addresses are different, the node allocates the second address resolution result to the user device, and configures a communication path between the user device and a second content server indicated by the second address resolution result. The user device accesses to the second content server on the communication path using the allocated second address resolution result.

18 Claims, 21 Drawing Sheets

PACKET COMMUNICATION SYSTEM AND PACKET COMMUNICATION METHOD, AND NODE AND USER DEVICE

CROSS-REFERENCE TO RELATED APPLICATION

This application is a continuation Application of a PCT international application No. PCT/JP2007/074008 filed on Dec. 13, 2007 in Japan, the entire contents of which are incorporated by reference.

FIELD

The embodiments discussed herein are related to packet communication system and a packet communication method, and a node and a user device.

BACKGROUND ART

One example of the techniques related to a contents delivery network (CDN) is a technique described in Patent Document 1 that is listed below.

Patent Document 1 describes that a tunnel and redirection apparatus exchanges packets on a first tunnel that is configured between a user device and a provider center (World Wide Web (WWW) server, Domain Name System (DNS) server) on the Internet, configures a second tunnel with a content server of the provider, extracts packets from the user device to the content server on the first tunnel, converts packets on the second tunnel and transfers them to the content server, and converts packets from the content server to the user device on the second tunnel into packets on the first tunnel and transfers them to the user device. According to this technique, the user can convey packets via a plurality of network tunnels only by managing a single network tunnel.

In addition, Non-Patent Document 1 listed below studies a technique that enables a user equipment (UE) to directly perform a communication with an external packet data network (PDN) from a visited network to which the UE moves to (visit), bypassing a home network (known as the "local breakout technique") in a next-generation mobile communication system of the 3rd Generation Partnership Project (3GPP).

Patent Document 1: International Patent Publication No. W02003/043276

Non-Patent Document 1: 3GPP TR 23.882 V1.9.0 (2007-03), "3GPP System Architecture Evolution: Report on Technical Options and Conclusions": Sec7.2

SUMMARY

The embodiments disclose a packet communication system and a packet communication method, and a node and a user device as set forth below.

(1) According to an aspect of the embodiments, a system includes a packet communication system including a user device; a node that is capable of receiving packet data sent by the user device; a plurality of content servers for which a communication path is configurable from the node; a plurality of address resolution servers that are communicatively connected to the node and that resolve addresses used for accessing the content servers based on a source of received packet data; a transfer device that transfers, to a first address resolution server, first packet data sent by the user device for accessing a first content server; a transmission device that generates second packet data including the node as a sender of the first packet data, and sends the second packet data to a second address resolution server; a comparison device that compares first and second address resolution results sent back from the first and second address resolution servers for the first and second packet data; and a communication path configuration device that, when the first and second address resolution results do not match, allocates the second address resolution result to the user device, and configures a communication path between the UE and a second content server indicated by the second address resolution result.

(2) In addition, according to an aspect of the embodiments, a method includes a packet communication method in a packet communication system, including a user device, a node that is capable of receiving packet data sent by the user device, a plurality of content servers for which a communication path is configurable from the node, and a plurality of address resolution servers that are communicatively connected to the node and that resolve addresses used for accessing the content servers based on a source of received packet data, the method including: the node transferring, to a first address resolution server, first packet data sent by the user device for accessing a first content server, and generating second packet data including the node as a sender of the first packet data, and sending the second packet data to a second address resolution server; the node comparing first and second address resolution results sent back from the first and second address resolution servers for the first and second packet data; and the node allocating, when the first and second address resolution results do not match, the second address resolution result to the user device, and configuring a communication path between the UE and a second content server indicated by the second address resolution result, the user device accessing to the second content server on the communication path using the allocated second address resolution result.

(3) Furthermore, according to an aspect of the embodiments, an apparatus includes a node in a packet communication system, including a user device, a node that is capable of receiving packet data sent by the user device, a plurality of content servers for which a communication path is configurable from the node, and a plurality of address resolution servers that are communicatively connected to the node and that resolve addresses used for accessing the content servers based on a source of received packet data, the node including: a reception device that receives first packet data sent by the user device for accessing a first content server; a generation device that generates second packet data including the node as a sender of the first packet data; a transmission device that sends the first packet data to a first address resolution server and sends the second packet data to a second address resolution server; a comparison device that compares first and second address resolution results sent back from the first and second address resolution servers for the first and second packet data; and a communication path configuration device that, when the first and second address resolution results do not match, allocates the second address resolution result to the user device, and configures a communication path between the UE and a second content server indicated by the second address resolution result.

(4) In addition, according to an aspect of the embodiments, an apparatus includes a user device in a packet communication system, including a user device, a node that is capable of receiving packet data sent by the user device, a plurality of content servers for which a communication path is configurable from the node, and a plurality of address resolution servers that are communicatively connected to the node and that resolve addresses used for accessing the content servers based on a source of received packet data, the user device including: a transmission device that sends first packet data for accessing to a first content server; a reception device that, when a node in the packet communication system, receiving the first packet data, sends the first packet data to a first address resolution server, and generates second packet data including the node as a sender of the first packet data and sends the second packet data to a second address resolution server, receives a second address resolution result that is sent from the node, when first and second address resolution results sent back to the node from the first and second address resolution servers do not match; and a communication control device that accesses to the second content server on a communication path configured by the node with a second content server indicated by the second address resolution result using the second address resolution result.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereinafter, embodiments will be described with reference to the drawings. Note that the embodiments are not limited to the embodiments to be described below, but may be modified in various ways without departing from sprits and scope of the embodiments, as a matter of course.

(1) Overview

Next-generation mobile communication systems have adapted broader bands, and Internet connections through a mobile network are expected to be increased. As a service for a fast distribution of contents over the Internet, a contents delivery network (CDN) service has been known which employs a Domain Name System (DNS) redirection for resolving, from an Uniform Resource Locator (URL), an Internet Protocol (IP) address of a content server which is located near a user.

Figure 1:
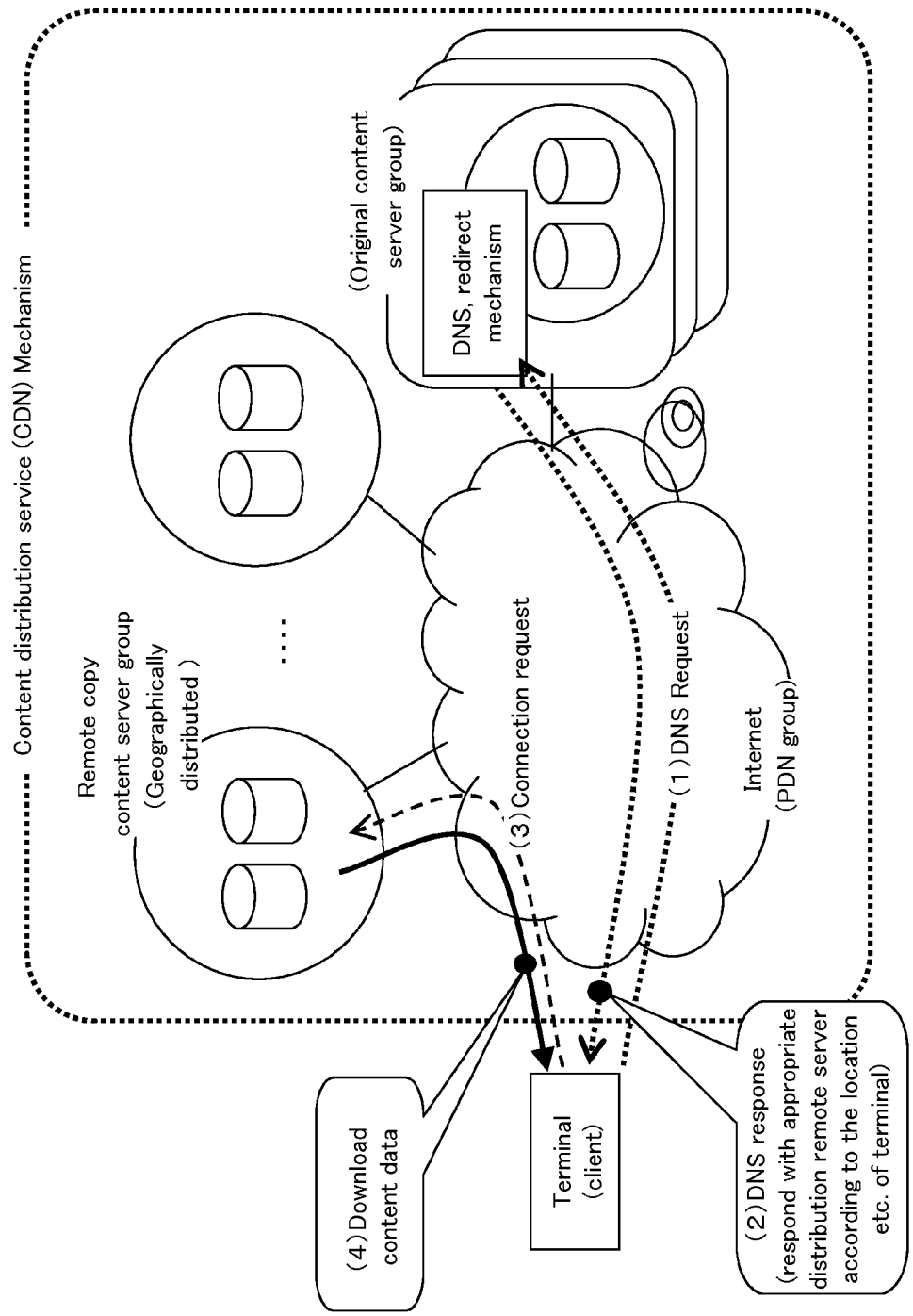
FIG. 1 is a schematic diagram illustrating a contents delivery network (CDN) service.

As an example, as depicted in FIG. 1:

(1) In a CDN utilizing the DNS redirection, a client (user) terminal sends a DNS request to a site (URL) (original content server) that possesses an original content which the user wants to access, in an attempt to identify the IP address of the site.

(2) The redirection mechanism within the CDN finds the location of the client terminal from the sender address in the DNS request packet, identifies, based on the location, a site (remote copy content server) which has a copy of the content and thus allows a faster distribution because of its vicinity to the user, and sends back the IP address of that site to the client terminal as a DNS response.

(3) The client terminal establishes a connection with the site based on that IP address.

(4) The client terminal downloads the content from the site.

Figure 2:
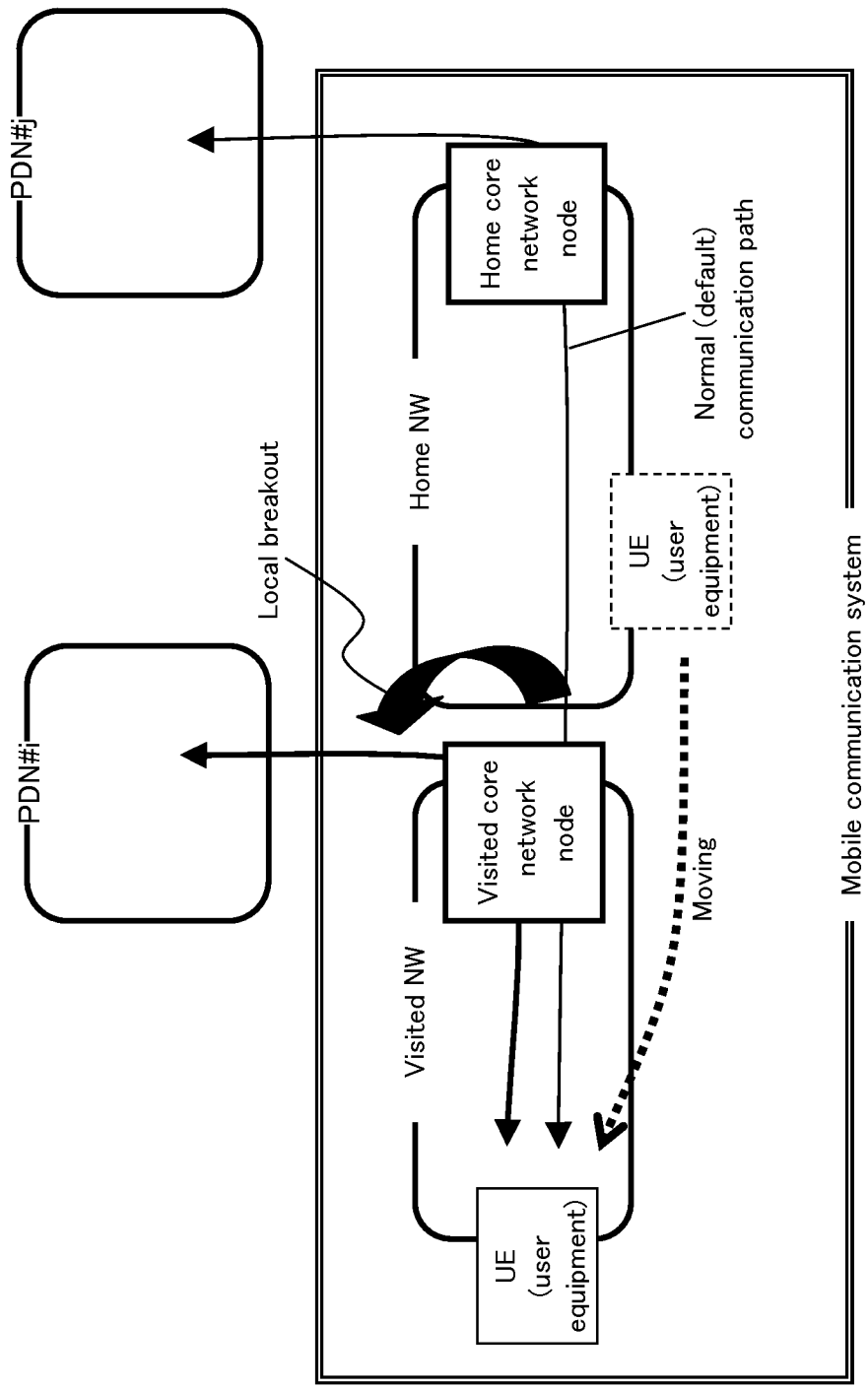
FIG. 2 is a diagram schematically illustrating the configuration of a mobile communication system for describing a local breakout.

Effective utilization of the CDN is expected for next-generation mobile communication systems. In a next-generation mobile communication system of the 3GPP (see Non-Patent Document 1 listed above, for example), a technique, so-called "local breakout" has been studied in which a mobile station that is a user equipment (UE) can communicate with an external packet data network (Packet Data Network (PDN)) directly from a visited network (visited NW), in stead of relaying a home network (home NW), as exemplified in FIG. 2.

Such a local breakout can reduce communication latency since the UE can directly communicate with an external PDN without relaying the home network. Note that a "home network" refers to a core network that is operated and maintained by a network operator (such as a carrier or provide) with which a user (UE) makes a contract, and a "visited network" is a core network operated and maintained by a different network operator.

In some occasions, however, the user (UE) does not want to use a local breakout.

This is because such a service of local breakout requires to consume (or obtain) communication resources (such as an IP address, a communication path, or bandwidth) for a local breakout in a visited network, in addition to communication resources used for communications (home routed traffics) via the network (home network) of the network operator with which the user makes a contract, which incurs additional fees.

In addition, when no CDN is available even if a local breakout is carried out, for example, when no remote server that contains a copy of an original content is available in the PDN, no optimization of a download path by means of the CDN is achieved. Thus, a significant improvement in a communication speed (content download speed) is not expected compared to communications via the home network, which may be considered to be less cost-effective.

Furthermore, it is expected that network operators want to reduce reservation of such communication resources for a local breakout as much as possible. This is because it is expected that communication resources become more valuable in the future as the quality of service (QoS) communication requirements (such as bearer counts dependent on the QoS) is becoming stronger. As used herein, the "bearer" refers to a logical communication path (data transfer route) for which the communication party, the QoS, and the like are defined.

Accordingly, it is desirable that communications by means of a local breakout is temporarily enabled when a user (UE) is in (visits) a visited network other than the home network. For example, it is desirable that a local breakout is performed when the site that connects to a PDN that is connectable via a local breakout provided by a visited network to which the UE moved supports the CDN.

One technique to achieve such a local breakout, for example, a technique is considered in which a redirection mechanism of a CDN is provided to a visited network to which the UE moves, DNS requests in communications via the home network is monitored, a site (remote copy content server) that is close to the visited network to which the UE moves is identified if the request is a request for a target site of the CDN (address resolution is performed), and connection (local breakout) to that site is prompted to the UE.

However, this technique requires a significant facility cost since redirection mechanisms having a scale as great as possible to support a large number of original sites provided by respective CDN providers to all of the networks to which the UE can move.

For this reason, the embodiment described above enables a local breakout at a visited network to which the UE moves by means of simple communication controls without providing specialized apparatuses (redirection mechanisms) for the CDN to visited networks.

(2) Example of Applied System

Figure 3:
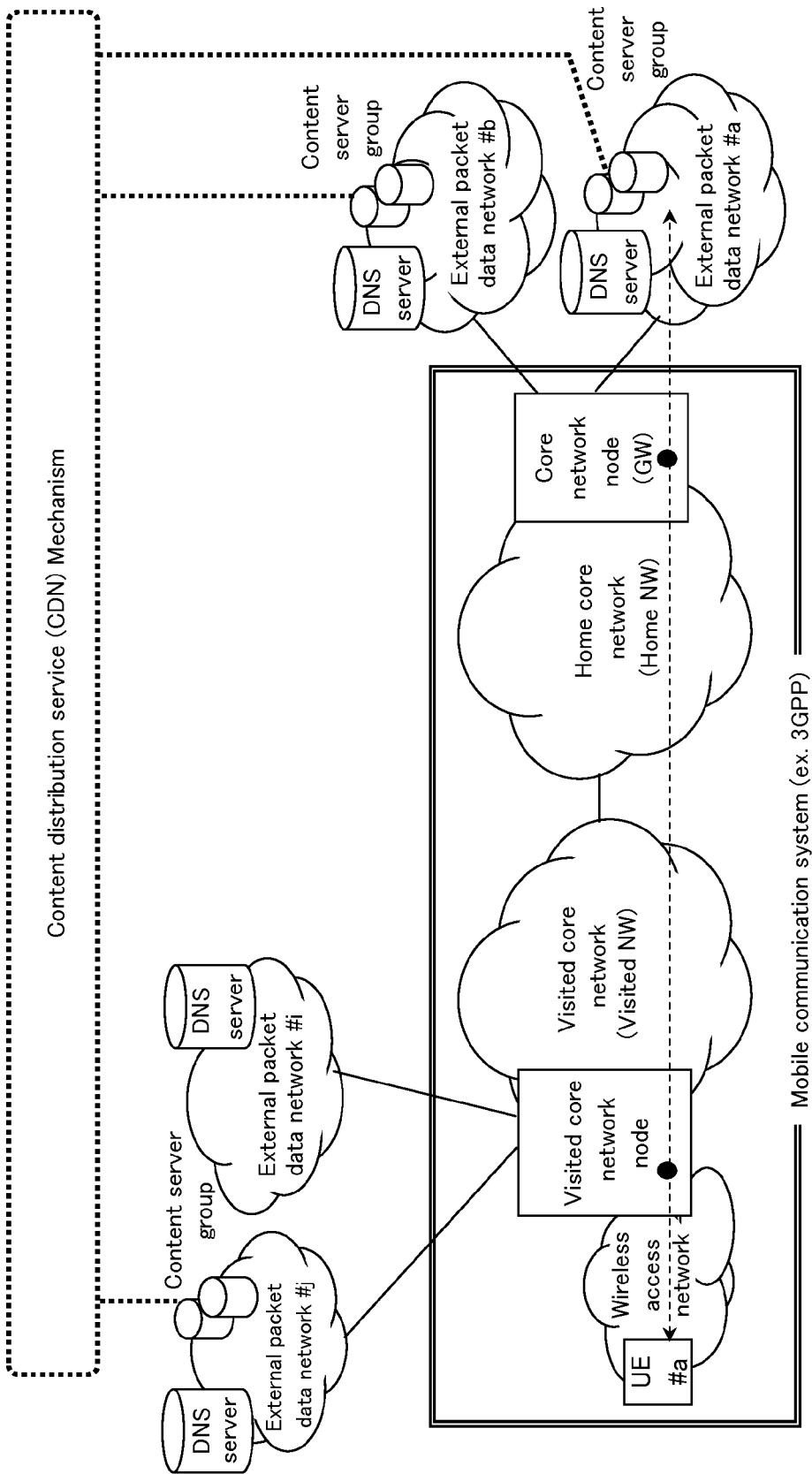
FIG. 3 is a diagram illustrating an example of the configuration of an applied system according to one embodiment.
Figure 4:
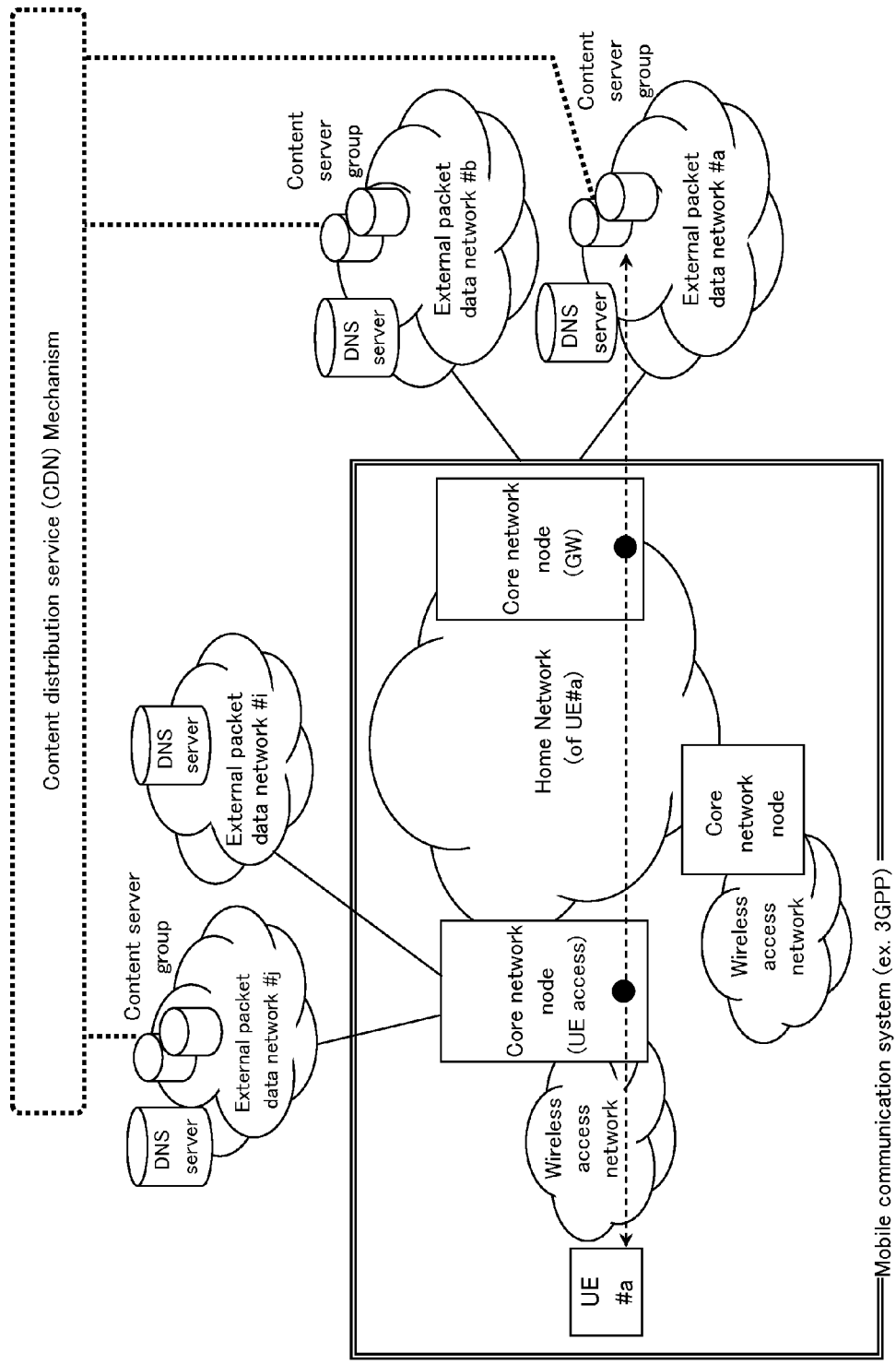
FIG. 4 is a diagram illustrating an example of the configuration of another applied system according to one embodiment.

FIG. 3 and FIG. 4 are diagrams illustrating configurations of an example of a 3GPP mobile communication system.

FIG. 3 depicts that a UE (#a) moves to (visits) a core network (visited NW) of an operator that is different from the operator of a home (core) network (home NW) the UE is subscribing.

The core network node (GW) is an entity of a home network, and functions as a gateway node for communicating with external packet data network (PDN) #a or #b based on a contract information with the UE, for example, and manages allocation of terminal IP addresses required for communications with the PDN #a or #b. This core network node (GW) corresponds to a GGSN (gateway general packet radio service (GPRS) support node) of an existing 3GPP system, or a packet data network-gateway (PDN-GW) of a next-generation system.

The visiting core network node is an entity of a visited network (visited NW) of the UE, and corresponds to a node that is an integration of a serving GPRS support node (SGSN) of an existing 3GPP system and a GGSN, or an entity (node) that is an integration of a serving-gateway (S-GW) of a next-generation system and a PDN-GW.

The SGSN or S-GW is a node that provides a communication path for a destination of the UE, and configures a communication path (bearer) between the GGSN or PDN-GW of the home network, configures a communication path (wireless bearer) of a wireless access network, and performs packet data transfer or the like using these.

In the example depicted in FIG. 3, similar to the home network, a GGSN (or PDN-GW) that is located in a visited network and from which a connection to an external PDN #i or #j is configurable, is integrated with an SGSN (or S-GW) of the visited network.

In the example depicted in FIG. 3, the UE typically communicates with the external PDN #a or #b via (the SGSN/S-GW function section of) the visiting core network node and the core network node of the home network. However, when (a copy of) a content which the UE wants to use is located in the CDN mechanism (architecture) in the external PDN #i or #j that connects to (the GGSN/PDN-GW function section of) the visiting core network node, the UE can access the content of the PDN #i or #j (server), bypassing the core network node of the home network (local breakout).

On the other hand, FIG. 4 depicts example in which the UE is within the home network.

The core network node (GW) of the home network is a default gateway node (GGSN/PDN-GW) used by the UE when communicating, and represents the case when the UE moves within the home network, and another core network node (UE access node) that encompasses the wireless access network in the accessed area is similar to the example in FIG. 4, a node that can configure a communication path to the external PDN #i or #j (a node that is an integration of a GGSN and a SGSN, or a node that is an integration of a PDN-GW and a S-GW).

In the example depicted in FIG. 4, when (a copy of) a content which the UE wants to use is located in the CDN mechanism (architecture) in the external PDN #i or #j a connection of which can be configurable from the UE access node, the UE can access the content of the PDN #i or #j (server), bypassing the default core network node (GW) which the UE was using for communication before its moving.

Figure 5:
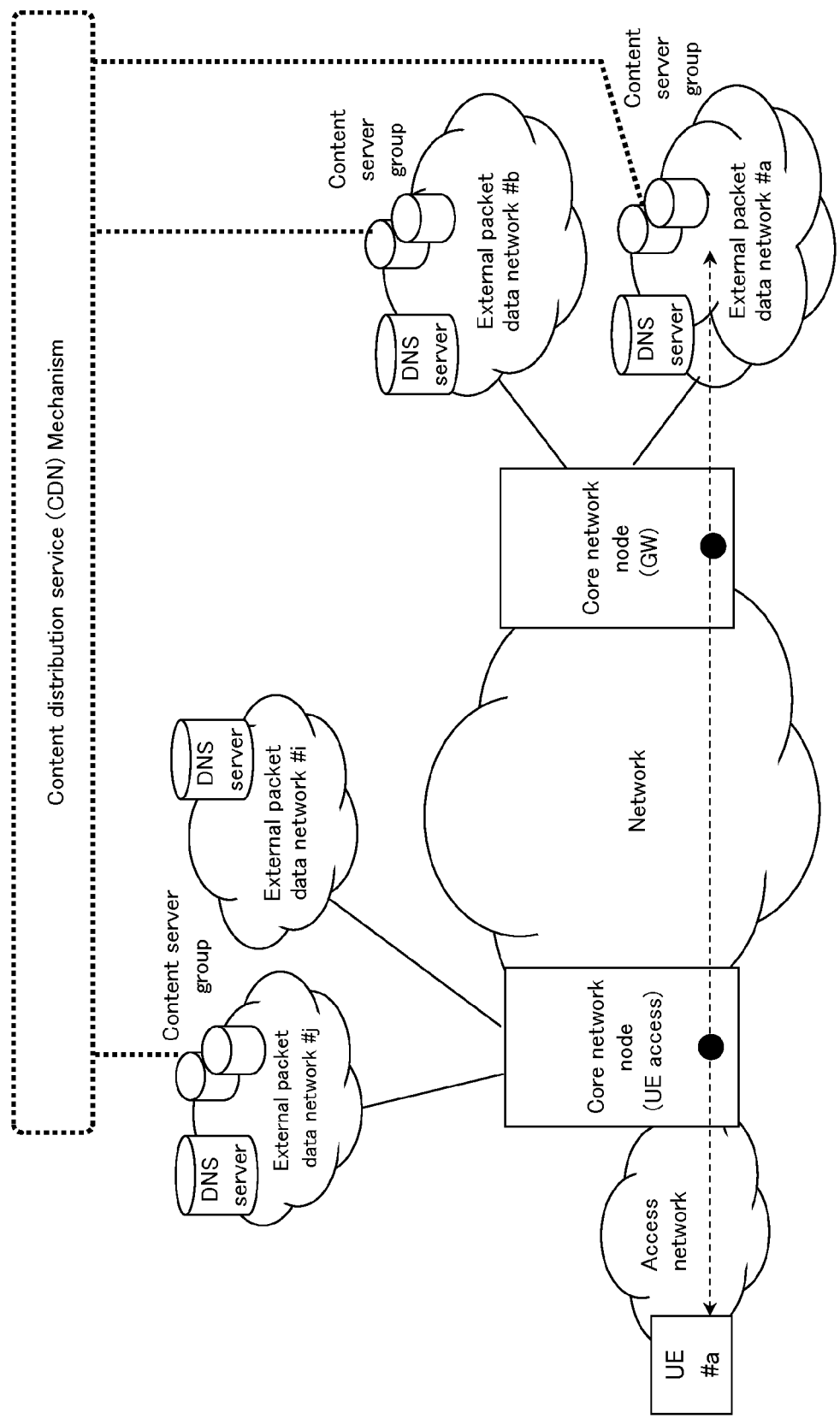
FIG. 5 is a diagram illustrating an example of the configuration of another applied system according to one embodiment.

FIG. 5 illustrates an example of a network configuration of a mobile communication system other than that of 3GPP.

Even if the access network accommodating the UE is not an access network that is not based on any wireless technique, a local breakout can be applicable to this system, provided that the functional deployment of the core network node (the relationship between the GW and the UE access node) and the accommodation configuration of external packet data networks are similar to the configuration in FIG. 4 or FIG. 5

That is, when (a copy of) a content which the UE wants to use is located in the CDN mechanism (architecture) in the external PDN #i or #j a connection of which can be configurable from the UE access node, the UE can access the content of the PDN #i or #j (server), bypassing the core network node (GW) the UE was using before its moving for communication.

(3) Example of Entire Operation

Subsequently, an example of the system operation for realizing a local breakout of this example will be explained with reference to FIG. 6 to FIG. 10. Note that FIG. 6 and FIG. 7 presume an example of the configuration of the 3GPP mobile communication system depicted in FIG. 3, as an example of an applied system.

Figure 6:
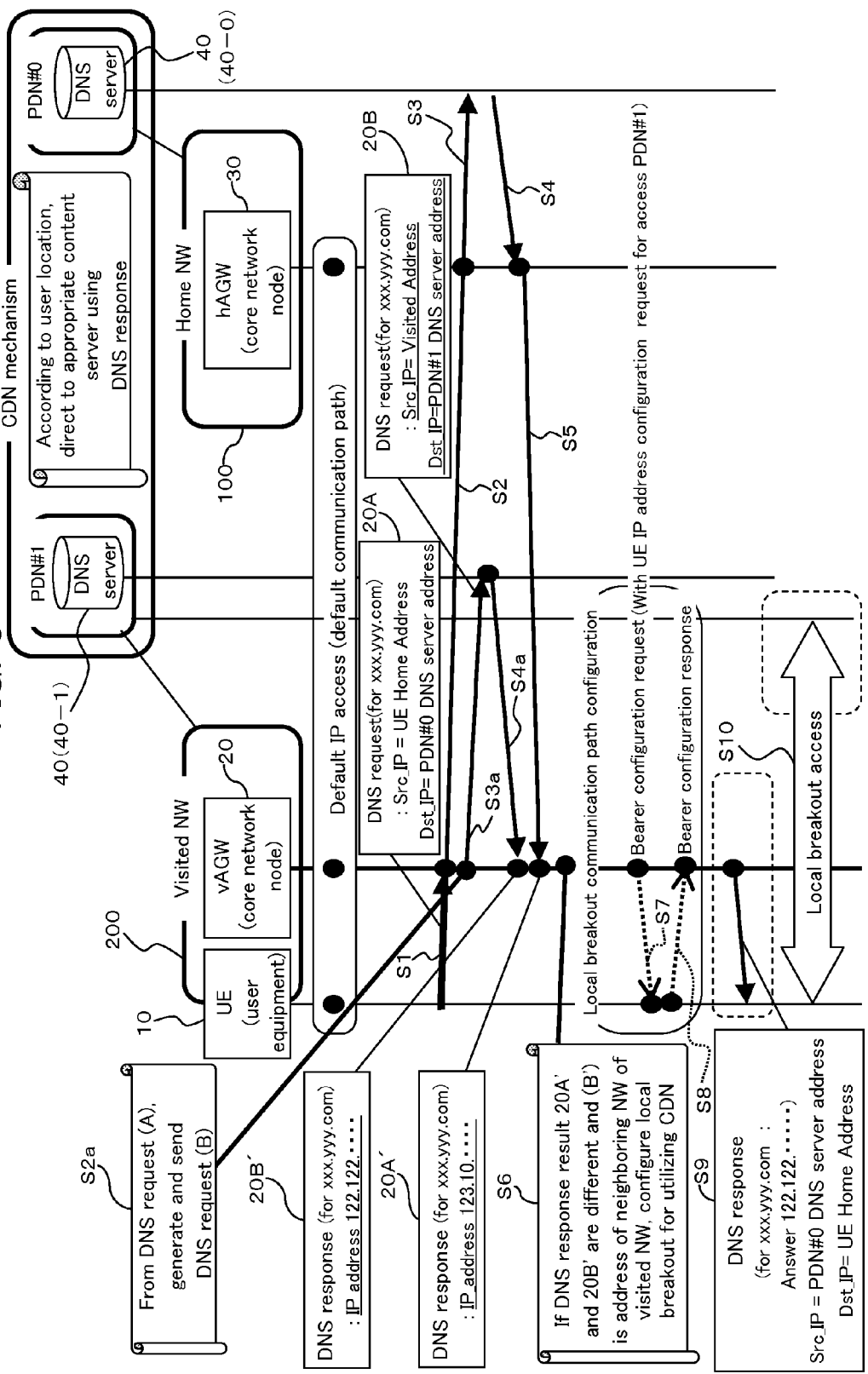
FIG. 6 is a sequence diagram illustrating an example of the operation of the system according to one embodiment.

FIG. 6 depicts an example in which a UE 10 makes a contract with a network operator of a home network (Home NW) 100 for communications via the home network 100, and moves to (visits) a network (visited NW) 200 that is operated and maintained by an operator that is different from the network operator of the home network 100 subscribed by the UE 10.

FIG. 6 depicts an example having a home AGW (hAGW) 30 as the core network node (access gateway (AGW)) of the home network 100, and a vAGW (visited AGW) 20 as the core network node (AGW) of the visited network 200.

In addition, there are a plurality of PDNs 300 (#0, #1, . . . ), wherein a the PDN #0 is a PDN that is connected to a home network 30 and of which communication path (bearer) is configurable from the hAGW 30, and a the PDN #1 is a PDN that is connected to the visited network 200 and of which communication path (bearer) is configurable from the vAGW 20, for example.

Furthermore, a DNS server 40 is arranged in the PDNs #0 and #1, respectively. The DNS server 40 includes an address resolution function that determines, in accordance with the location (a sender address of a DNS request, for example) of the user (UE 10), an IP address (resolves an address resolution) of an appropriate content server (a server that is located in a location closer to the user, for example) for accessing by the user, and returns the result to the UE 10 by means of a DNS response.

The content server group includes an original content server that owns original contents and a (remote) copy content server that owns copies of the original contents, the servers being distributed geographically. For example, the copy content server may belong to the same PDN to which the original content server belongs, or may belong to a different PDN. In addition, the contents owned by the content server (that is, contents that may be provided to the UE 10) include various types of data, such as document data, graphic data, video data, and sound data.

The DNS server 40 owns address information in one or more PDNs (including address information of content servers), and performs an address resolution described previously based on the address information. Note that the DNS server 40 does not own address information of all of content servers forming the CDN mechanism, and generally, does not own address information of content servers that do not belong to the PDN accommodated in the core network (AGW) of a different network operator.

In the example depicted in FIG. 6, it is illustrated that a DNS server 40-0 owns and manages address information in the PDN #0 accommodated in the home network 100 (hAGW 30), and a DNS server 40-1 owns and manages address information in the PDN #1 accommodated in the visited network 200 (vAGW 20).

Note that the UE 10 includes a communication device, such as a cellular phone, a PDA, a notebook PC. In addition, the UE 10 may be a communication device that connects (attaches) to a wireless or wired access network accommodated by the vAGW 20 or the hAGW 30 by means of a wired interface.

In addition, the UE 10 does not directly connect to the vAGW 20 or the hAGW 30 that is a core network node, but performs communications via a wireless or wired access network that accommodates the core network node. However, in the example in FIG. 6, the access network that is located between the UE 10 and the vAGW 20 are omitted from illustration. In the following, a description will be given as if the UE 10 is directly connected to a core network node, such as the vAGW 20 or the hAGW 30, such a description is given for convenience, and actually a connection via a wireless or wired access network is meant.

In a next-generation system that is currently discussed by the 3GPP, the UE 10 is provided with an IP connection called "default IP access" when the UE 10 attaches to a wireless access network. For example, when the UE 10 attaches to a wireless access network that accommodates the vAGW 20 of the visited network 200, an access communication path (bearer as one example of the default communication path) at the default IP address (home address) via the UE 10, the vAGW 20, and the hAGW 30 is configured and established, which enables communication with the default PDN (for example, the PDN #0) that is determined by the contract information or the preference.

Note that, prior to an establishment of the default communication path (bearer), subscriber information (for example, types of services available to the UE 10) required for providing a service for the UE 10 is conveyed from the home network 100 (hAGW 30) to the visited network 200 (vAGW 20). Thereby, the vAGW 20 can configure a bearer between the UE 10 and the hAGW 30.

As depicted in FIG. 6, when the UE 10 accesses a certain content (site (URL)), the UE 10 sends a DNS request (first packet data) 20A via the default communication path to the DNS server 40 (40-0) that can be reached from the default PDN #0 in an attempt to identify (to resolve) the address of a content server that owns the content (Step S1).

The address of the DNS server 40 is given from the hAGW 30 in the process of establishment of the default communication path by the service provided by the home network 100, or obtained by the UE 10 in communication with the default PDN #0, or has been configured and maintained in the UE 10 in advance.

The destination address in the DNS request is an address of such a DNS server 40, and the sender address is the default IP address (home address) allocated from the hAGW 30 used by the UE 10 for communicating via the hAGW 30. A packet having a sender address of this home address is received by the vAGW 20 in the visited network 200, that packet is transferred to the hAGW 30.

The UE 10, in response to the DNS request 20A, can access the content (download the content) on the default communication path using the IP address of the content (server) resolved in a DNS response (first address resolution result) 20A' that is sent back from the default PDN #0 (DNS server) on the default communication path.

Here, if a copy of the content is present in a site (remote copy content server) in a PDN (for example, the PDN #1) for which a communication path configuration (hereinafter, also referred to as "connection configuration") is configurable from the vAGW 20, it is more preferred that the UE 10 accesses the remote copy server on a communication path via the vAGW 20 (alternative communication path), rather than on the default communication path via the hAGW 30 (performs a local breakout) from the viewpoint of route optimization.

For this purpose, the vAGW 20 in this example monitors DNS traffics (DNS packet flows) both in the uplink (UL) direction from the UE 10 to the PDN and the opposing downlink (DL) direction.

In response to detecting an UL DNS request 20A that is to be monitored, the vAGW 20 transfers that DNS request 20A to the DNS server (first address resolution server) 40-0 in accordance with the destination address (DNS server address) (Step S2).

Figure 9:
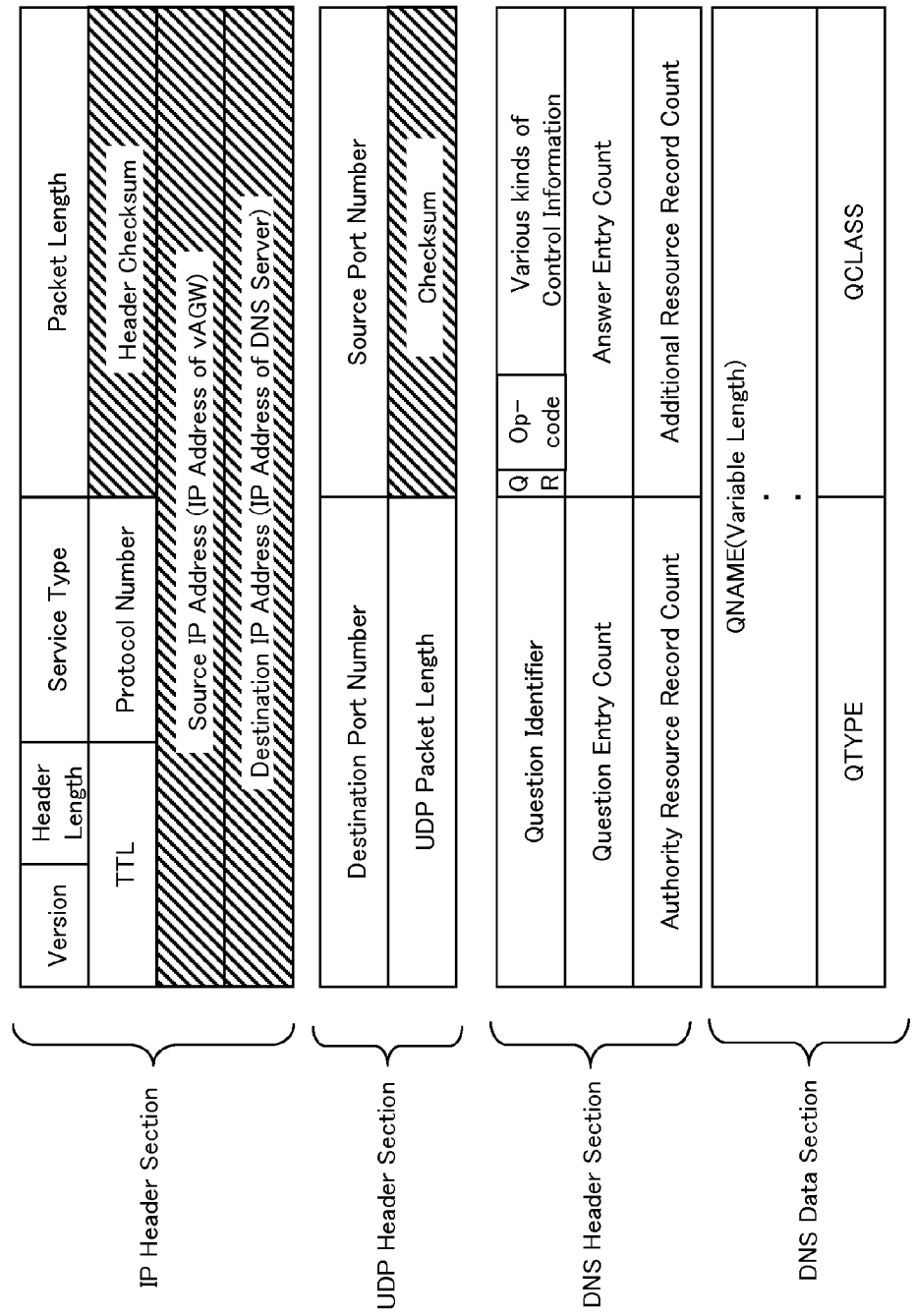
FIG. 9 is a diagram illustrating one example of the format of a DNS request packet.

At this time, the vAGW 20 copies the received DNS request 20A, as depicted in FIG. 9, for example, and generates and transfers a DNS request (second packet data) 20B that has the IP address of the local node (vAGW) 20 as a sender address (source IP address), and the IP address of the DNS server (second address resolution server) 40-1 that performs an address resolution at one of PDN (#1) the communication path of which is configurable from the local node 20, as a destination address (destination IP address) (Steps S2a and S3a). Note that FIG. 9 illustrates an example of the format of a DNS request packet, and information elements at the diagonally shaded area are to be written by the vAGW 20.

That is, the vAGW 20 attempts to access via the external PDN #1 the communication path of which with the UE 10 is configurable from the local node 20, as a proxy of the UE 10, to a different content server (remote copy content server) that owns the same content (copy) in the site (original content server) accessible via the external PDN #0 the communication path of which with the UE 10 is configurable from the hAGW 30 in the home network 100. Note that the information of DNS traffics in the UE 10 that is to be monitored can be obtained as subscriber information upon configuring the default communication path, for example.

The original DNS request 20A is transferred to the first DNS server 40-0 via the default communication path via the hAGW 30 in accordance with the destination address thereof (Step S3), and the DNS request 20B that is generated by copying is transferred to the second DNS server 40-1 in accordance with the destination address thereof.

The DNS server 40-0 that performs an address resolution at the PDN #0 and the DNS server 40-1 that performs an address resolution at the PDN #1 accommodated in the visited network 200, respectively resolve an address of the site for which an access is requested (content server) based on the sender addresses in the received DNS request 20A and 20B, and send DNS responses (packets) 20A' and 20B' containing a resolved IP address (hereinafter, also referred to as "resolution address") (first and second address resolution results) to the sender of the DNS request 20A or 20B (Step S4).

Since the sender address of the original DNS request 20A is the home address of the UE 10, the DNS response 20A' is transferred to the vAGW 20 in the visited network 200 via the hAGW 30 in the home network 100 (Steps S4 and S5). On the other hand, since the sender address of DNS request 20B that is copied at the vAGW 20 is the IP address of the vAGW 20, the DNS response 20B' is transferred to the vAGW 20 (Step S4a).

That is, both of the DNS responses 20A' and 20B' are received by the vAGW 20. The vAGW 20, in response to detecting reception of both of the DNS responses 20A' and 20B' while monitoring DL DNS traffics that are to be monitored, extract respective DNS responses 20A' and 20B', and compares the respective resolution addresses.

When the addresses do not match, the vAGW 20 can determine that the site (remote copy content server) that owns the copy of the original content is implemented with a CDN mechanism (capable of performing a local breakout), in the site indicated by the resolution address contained in the DNS response 20B' in response to the DNS request 20B that is sent by the vAGW 20 as a proxy, that is, in an external network (the PDN #1) the communication path of which is configurable from the vAGW 20 in the visited network 200.

Note that, when the DNS response 20A' in response to the original DNS request 20A cannot be received by the vAGW 20 within a certain time period for some reasons, the vAGW 20 can determine that a communication path (bearer) with the PDN #1 is available (a local breakout can be performed) by detecting that the resolution address contained in received DNS response 20B' is the IP address in the PDN #1 the communication path of which is configurable from the local node 20, for example.

In addition, when the DNS server 40-1 also manages an IP address of a PDN that is an external network the communication path of which is configurable from the vAGW 20 but is different from the PDN #1, the resolution address may be an IP address in the PDN that is different from PDN #1 to which the DNS server 40-1, for which the DNS request 20A is addressed, belongs.

The vAGW 20, in response to recognizing the presence of the PDN #1 the communication path of which is configurable from the vAGW 20 (availability of a local breakout) as described above, initiates a local breakout (Step S6). That is, the vAGW 20, in response to detecting an unmatch of the resolution addresses in the DNS response 20A' and 20B', assumes that a CDN mechanism is also available the visited network 200 by the UE 10, and use it as a trigger to start (configure) a local breakout from the network (the vAGW 20) side.

Note that, when the resolution addresses match, or when no DNS response 20B' in response to the DNS request 20B, which is sent by as a proxy, is received, the vAGW 20 determines that a local breakout cannot be performed and sends a DNS response 20B in response to the original DNS request 20A back to the UE 10.

The vAGW 20, in response to detecting an initiation trigger of a local breakout, initiates configuration processing of a local breakout with the UE 10. The configuration processing may be performed as a procedure initiated by the network side (vAGW) (NW-initiated procedure) or a procedure initiated by the UE 10 (UE-initiated procedure).

When a NW-initiated procedure is performed, the vAGW 20 prepares allocation of the IP address resolved in the DNS response 20B' (the IP address for connection to the PDN #1) to the UE 10, and performs setup of a communication path (bearer) for a local breakout to the UE 10 in a bearer setup procedure initiated by the network side (NW-initiated).

That is, the vAGW 20 generates a bearer configuration request addressed to the UE 10, and sends it to the UE 10 (Step S7 in FIG. 6). At this time, the vAGW 20 preferably includes the IP address resolved in the DNS response 20B', as an information element (identification information of the communication flow), into the bearer configuration request.

Thereby, a bearer configuration request from the vAGW 20 to the UE 10 can be performed together with an allocation of a new IP address (the IP address for connection to the PDN #1) are performed, by utilizing a NW-initiated procedure having a pre-reservation of resources for communication, including reservation of a new terminal IP address on the mobile communication network side, which is being standardized under the initiative of the 3GPP. Thus, it is possible to reduce latency of bearer configuration, as compared to a UE-initiated procedure.

The UE 10, in response to receiving the bearer configuration request, recognizes that it is a local breakout of the NW-initiated procedure (NW-initiated local breakout), applies the local breakout to a given active application, and sends a bearer configuration response to the vAGW 20 (Step S8).

Note that the UE 10 can recognize that a communication path (local breakout service) to the PDN #1 via the vAGW 20 is available (initiation of a configuration procedure for that communication path) by detecting that the IP address contained in the bearer configuration request for connection to the PDN #1 (remote copy content server) and the IP address that has been used by the UE 10 for communication on the default communication path via the hAGW 30 are different. Therefore, addition or modification or the like of information for identifying the type of an existing bearer control message can be omitted.

Figure 10:
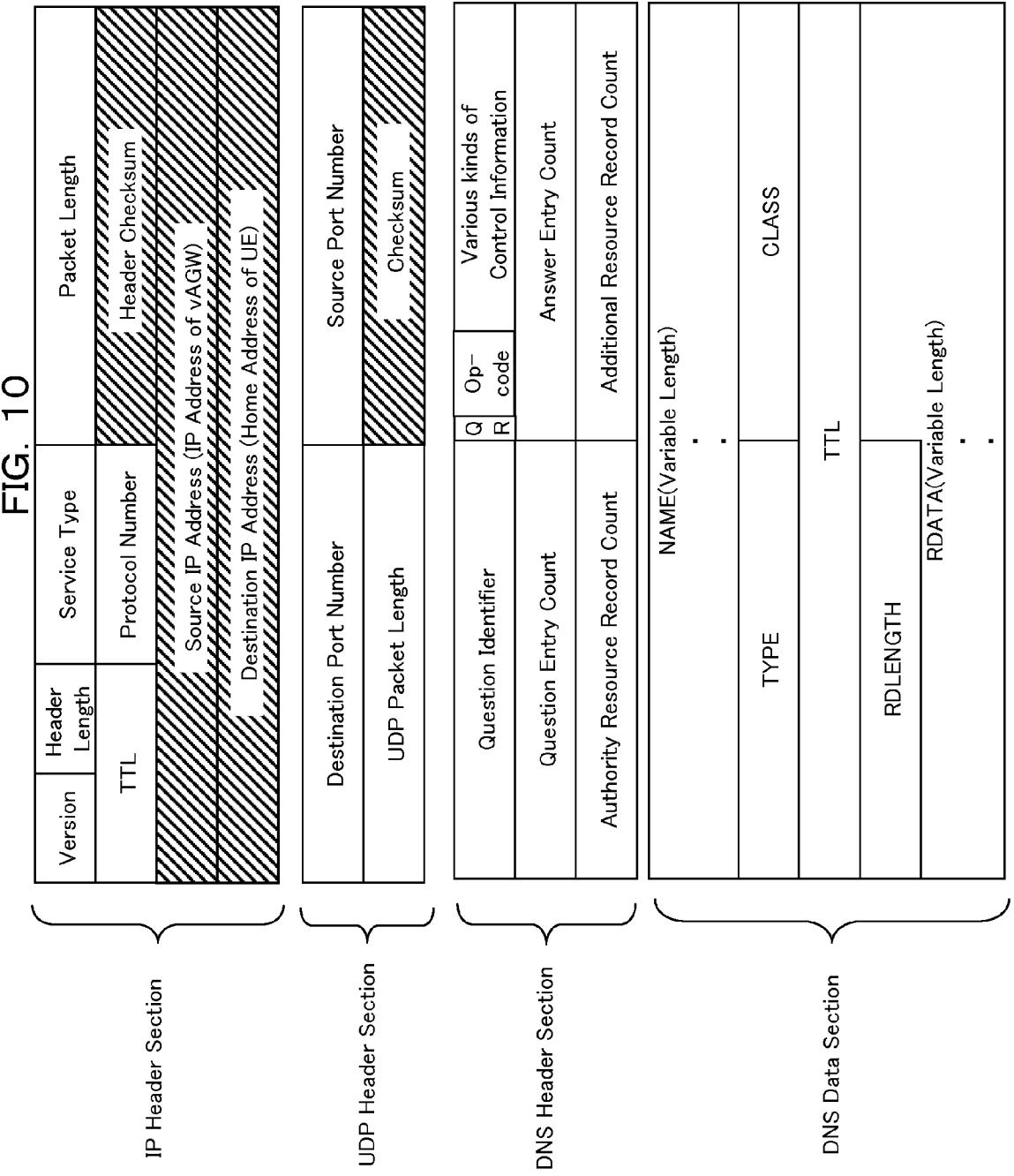
FIG. 10 is a diagram illustrating one example of the format of a DNS response packet.

In response to receiving the bearer configuration response, the vAGW 20 sends the DNS response 20A' in response to the DNS request 20A sent by the UE 10 by setting the address of the DNS server 40-0 as the sender address, and the home address of the UE 10 as the destination address (see FIG. 10, for example), and sends it to the UE 10 (Step S9). Note that the diagonally shaded fields in FIG. 10 are fields to be rewritten by the vAGW 20.

On the other hand, when a UE-initiated procedure is used, the vAGW 20 notifies the UE 10 the presence of an effective communication path to the PDN #1 separately from the DNS response, or notifies by incorporating notification information of the presence into the DNS response. When the notification information is incorporated, the information may be set in the DNS data section (RDATA section) depicted in FIG. 10.

Figure 8:
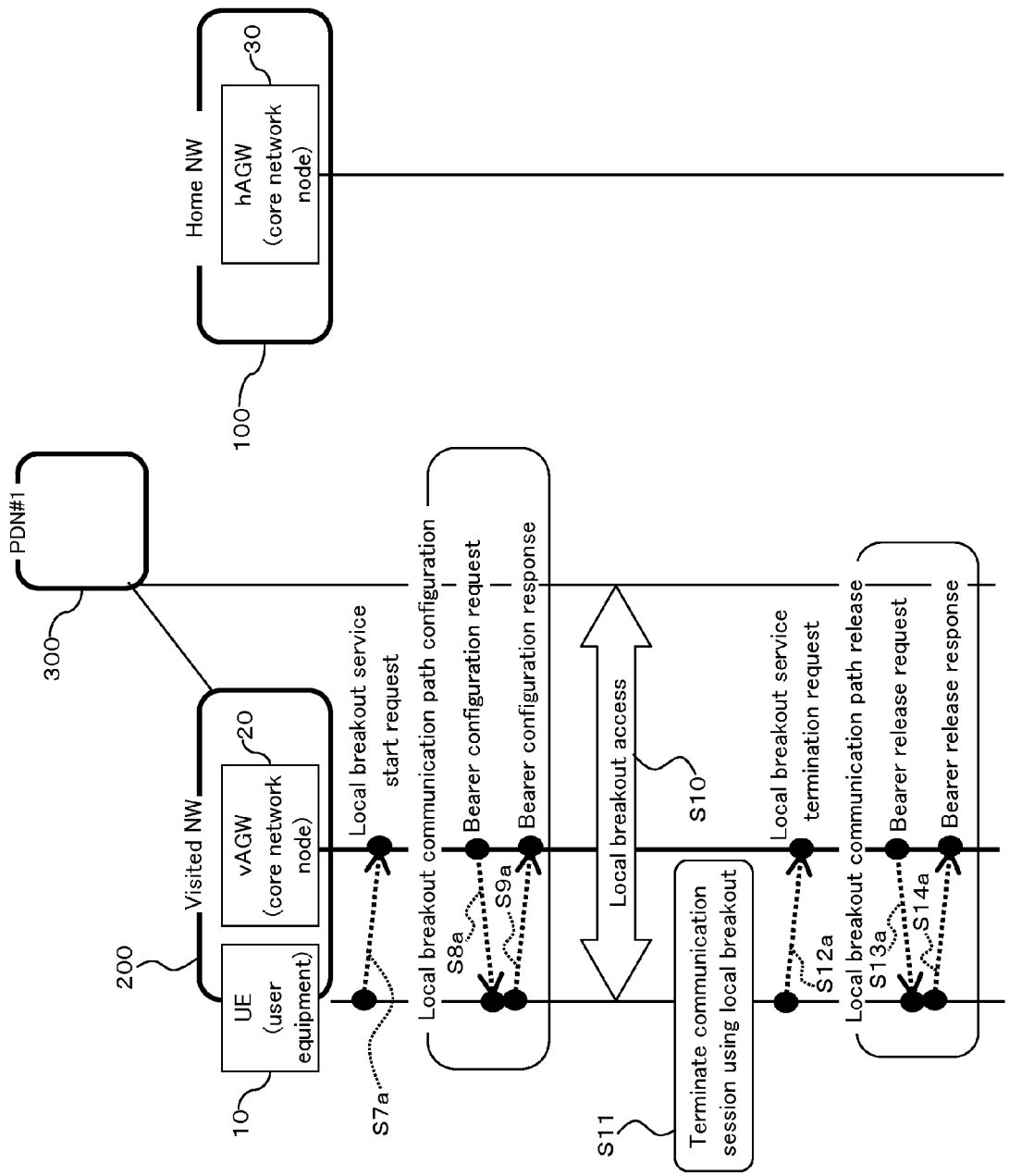
FIG. 8 is a sequence diagram illustrating an example of the operation of the system according to one embodiment.

In response to receiving the notification (information), the UE 10 recognizes the presence of the effective communication path to the PDN #1, and initiates a setup procedure of a communication path (bearer) to the PDN #1. As depicted in FIG. 8, for example, the UE 10 requests the vAGW 20 to initiate a local breakout service (Step S7a), and the vAGW 20, in response to receiving the initiation request, performs a setup sequence of a bearer (communication path) for the local breakout (transmission of a bearer configuration request, and reception of a bearer configuration response) (Steps S8a and S9a).

Upon completion of the bearer setup for the local breakout by means of an NW-initiated procedure or UE-initiated procedure as described above, the UE 10 communicates with the remote copy content server using the established bearer (Step S10).

Thereafter, upon termination of the communication (session), the UE 10 performs a release processing for the bearer for the local breakout. Although not necessary, the bearer release processing is preferably performed from the viewpoint of effective usage of communication resources. The timing for performing the bearer release processing is mandatory, and both of an NW-initiated procedure and a UE-initiated procedure may be applicable, for example.

Figure 7:
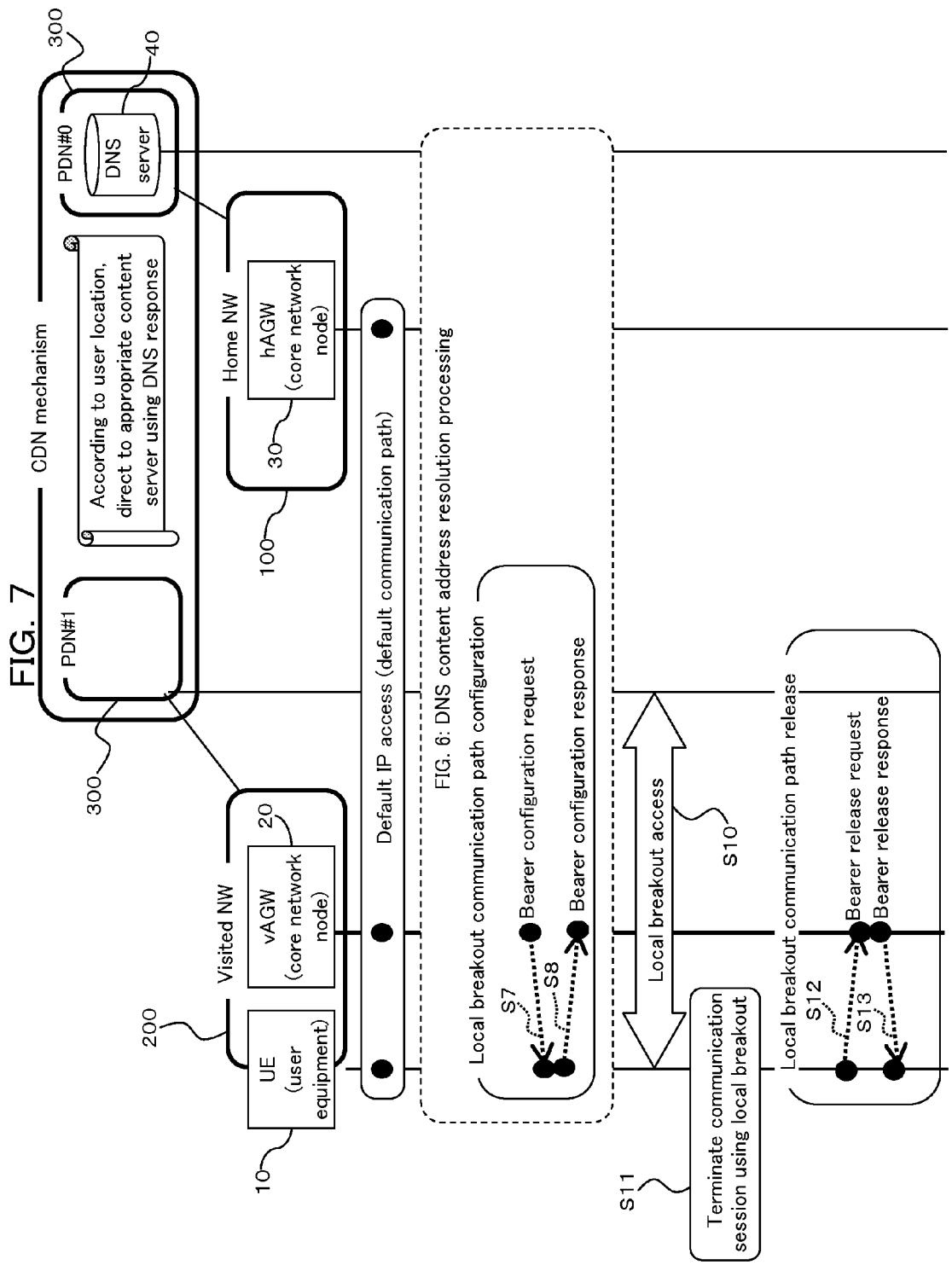
FIG. 7 is a sequence diagram illustrating an example of the operation of the system according to one embodiment.

When a UE-initiated procedure is used, as depicted in FIG. 7, for example, upon termination of the local breakout communication (session) (Step S11), the UE 10 sends a bearer release request to the vAGW 20 (Step S12). In response to receiving the bearer release request, the vAGW 20 releases communication resources reserved for the local breakout communication (bearer) and sends a bearer release response back to the UE 10 (Step S13). In response to receiving the bearer release request, the UE 10 releases communication resources reserved for the bearer for the local breakout.

On the other hand, when a NW-initiated procedure is used, as depicted in FIG. 8, for example, upon termination of the local breakout communication (session) (Step S11), the UE 10 sends a termination request of the local breakout service to the vAGW 20 (Step S12a), the vAGW 20 sends a bearer release request to the UE 10 by receiving the termination request (Step S13a).

In response to receiving the bearer release request, the UE 10 releases communication resources reserved for the local breakout communication (bearer) and sends a bearer release response back to the vAGW 20 (Step S14a). In response to receiving the bearer release response, the vAGW 20 releases communication resources reserved for the local breakout.

Note that termination of the local breakout communication can be determined by monitoring traffics on the bearer for the local breakout by an entity (vAGW 20) on the network side. For example, the vAGW 20 determines that the local breakout communication is terminated when a state is detected where there is no packet flow for a certain time period on the bearer for the local breakout (no communication state). In this case, the vAGW 20 can initiate the bearer release processing (sends the bearer release request to the UE 10 in Step S13a) without waiting for a termination request from the UE 10.

In this case, however, a bearer that is not needed any more may be maintained, depending on the time until a no communication state is detected. A bearer for a local breakout can be regarded as a temporary communication path specialized for a certain communication session. Thus, if improvement in the efficiencies of usage of resources is important while avoiding wasteful reservation of communication resources, release of the bearer for the local breakout is preferably performed using a UE-initiated procedure.

As described above, in the system in this example, the UE 10 detects (captures) a DNS request 20A for accessing from the UE 10 to the first PDN (#0) at the vAGW 20 accessed at the visited network 200, generates a DNS request 20B in response to the second PDN (#1) that is accessible from the vAGW 20 based on that DNS request 20A, and sends a DNS request 20A to the PDN #0, as well as sending a DNS request 20B to the second PDN #1.

When the address resolution result in response to that DNS request 20B (DNS response 20B') does not match the address resolution result corresponding to the DNS request 20A (DNS response 20A'), the vAGW 20 performs processing for setting an alternative communication path (bearer) between the second PDN #1 indicated by the DNS response 20B' and the UE 10.

Accordingly, without requiring to dispose a specialized apparatus (redirection mechanism) for the CDN in the vAGW 20, a local breakout service can be realized at a cost as low as the cost required for extending the functions of an existing AGW, thereby providing a communication path having a low access latency to the UE 10.

Here, the function of detecting DNS traffics is substantially the standard function of the AGW. Analysis on packet information is within the support scope of the AGW, and functions to copy packets, modify sender addresses, and compare resolution IP addresses can be substantially implemented by software upgrades of the AGW (vAGW 20). Accordingly, lower cost implementation is possible as compared to cases in which specialized apparatuses (redirection mechanism) are provided.

Hereinafter, one example of a core network node (vAGW) and a UE that realize a local breakout as described above will be described in detail.

(4) Core Network Node

Figure 11:
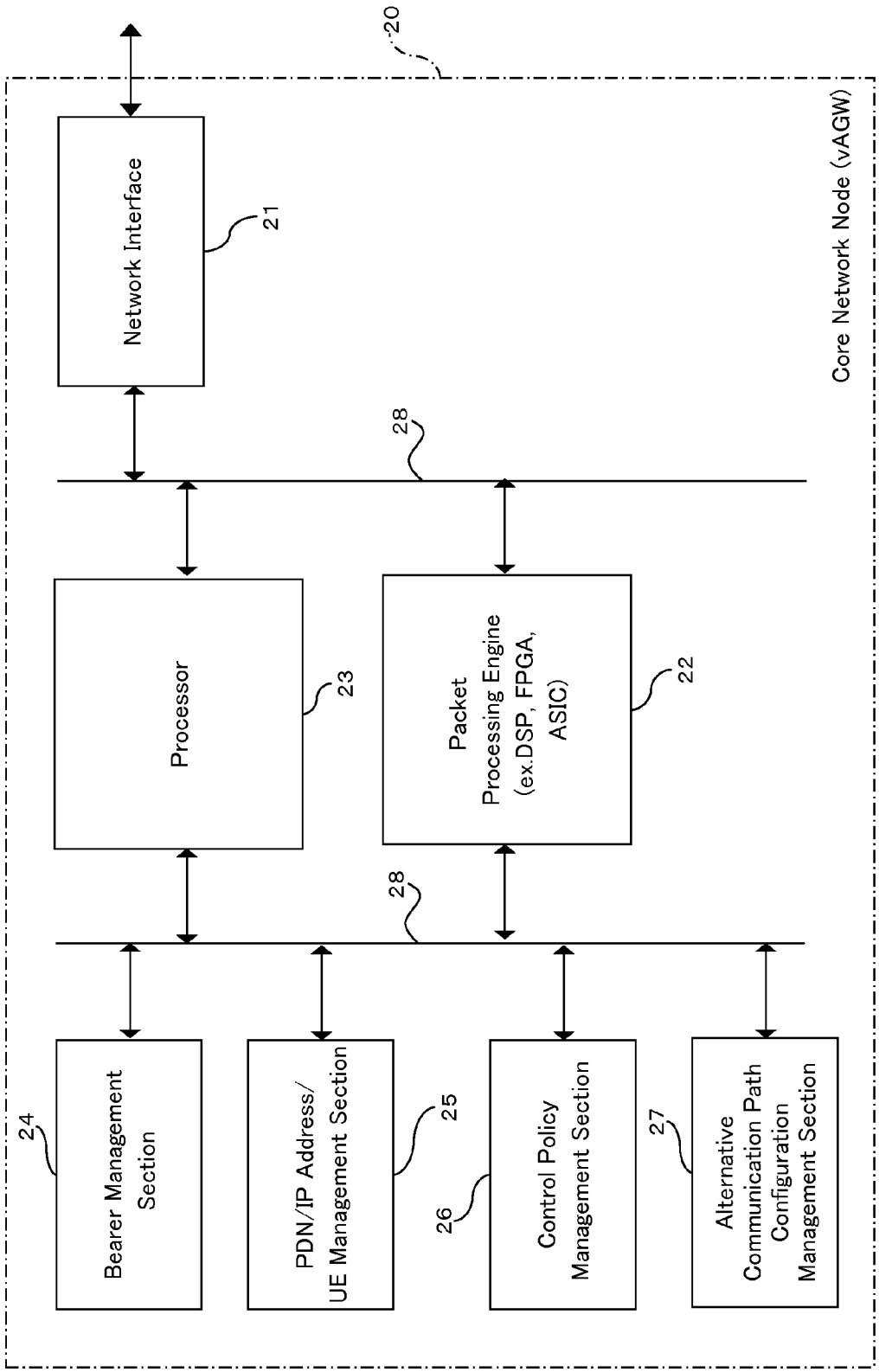
FIG. 11 is a block diagram illustrating a core network node according to one embodiment.

FIG. 11 is a block diagram illustrating an example of the configuration of a core network node (vAGW) 20. The core network node 20 depicted in FIG. 11 includes a network interface 21, a packet processing engine 22, a processor 23, a bearer management section 24, a PDN/IP address/UE management section 25, a control policy management section 26, and an alternative communication path configuration management section 27, for example. These components are communicatively connected to each other by a communication bus 28.

The network interface 21 includes a function to perform transmission and reception (routing) of data (packets) with the outside (entities in the visited network 200, and entities in the home network 100).

The packet processing engine 22 includes a packet routing function to distinguish between bearers, and to route packets based on the bearer configuration, a function to identify data addressed to the local node 20 and to distribute among processing sections in appropriate nodes, and a function to send and receive QoS control information, subscriber information, and the like, with the hAGW 30 in the home network 100 (termination processing).

In addition, the packet processing engine 22 also includes a function to detect and capture DNS traffics (DNS requests/responses) to be monitored in accordance with control (configuration data) from the control policy management section 26, and a packet routing function based on a bearer configuration of local breakout communications, based on data maintained and managed by the alternative communication path configuration management section 27 (data on a bearer for local breakout communications as an alternative communication path).

Note that the packet processing engine 22 can be implemented using an integrated circuit technique, such as a Digital Signal Processor (DSP), a Field Programmable Gate Array (FPGA), an Application Specific Integrated Circuit (ASIC), for example.

The bearer management section 24 is adapted to maintain and manage information required for bearer communications.

The PDN/IP address/UE management section 25 is adapted to manage PDNs to which the local node 20 connects, IP addresses to connect to those PDNs, service contract information on the UE 10, and the like, and to maintain and manage information on service status, such as an IP address group (address pool) which can be allocated to the UE 10 for each PDN, an IP address or PDN which is allocated to the UE 10 or is being used by the UE 10.

The control policy management section 26 is adapted to determine whether or not detection or capturing of the DNS traffics that are to be monitored can be performed, based on contract information (subscriber information) of the UE 10, and to maintain and manage data (setting data) for setting necessary setting on the packet processing engine 22 when detection or capturing is performed.

The alternative communication path configuration management section 27 is adapted to maintain and manage control data on an alternative communication path (bearer for a local breakout) that is newly established other than the default communication path.

The processor 23 includes functions to generate and terminate a bearer control message (such as a bearer configuration or release request) required to configure or release a bearer, to store information required by the bearer management section 24 and the alternative communication path configuration management section 27, and to setup settings on the packet processing engine 22 which is necessary for a bearer communication (including a local breakout communication) based on the information maintained and managed by the management sections 24 and 27.

In the core network node 20 that is configured described above, upon configuring a bearer for the default communication path or the like, bearer control messages (bearer configuration request and response) are exchanged with the UE 10 or with another core network node.

A bearer control messages is received by the network interface 21, is transferred to the packet processing engine 22 via the bus 28, is identified as a bearer control message by the packet processing engine 22, and is transferred to the processor 23 via the bus 28.

When the processor 23 analyzes the received bearer control message and identifies as a bearer configuration request, it extracts information to configure a bearer (such as a counter node address, bearer identification information) from the bearer configuration request and determine information required by the local node 20 for receiving packet flows on bearer (such as the local node address, bearer identifier).

The processor 23 further generates a bearer configuration response based on the determined information, and makes the bearer management section 24 maintain and manage the extracted and determined the information, and sets routing setting on the packet processing engine 22 according to information. The generated bearer configuration response is transferred to the packet processing engine 22 via the bus 28, is further transferred from the packet processing engine 22 to the network interface 21 via the bus 28, and sent to the counter node (for example, hAGW 30) or the UE 10 from the network interface 21.

On the other hand, when the processor 23 identifies the received bearer control message as a bearer configuration response during the above message analysis, it reflects settings or modifications (updates) of control parameters (such as QoS information of the bearer) to stored (setting) data in the bearer management section 24 and the packet processing engine 22 based on the contents of that bearer configuration response, if necessary.

In combination of the attach procedure of the UE 10, the core network node 20 itself may generate and send a bearer configuration request.

In this case, the processor 23 processes the attach processing, stores, to the PDN/IP address/UE management section 25, the service contract information of the UE 10 which is obtained in the process of the attach processing procedure, and determines the IP address allocated to the UE 10 based on the information in the management section 25. Alternatively, the processor 23 stores, to the management section 25, the IP address given to the UE 10 in a separate procedure, and generates a bearer configuration request, together with correspondence information (filter information) to packet identification information (such as an address) between the bearer and the UE 10 based on the information.

This bearer configuration request is also transferred to the packet processing engine 22 via the bus 28, is further transferred from the packet processing engine 22 to the network interface 21 via the bus 28, and sent to the counter node or the UE 10 from the network interface 21.

Note that a bearer control message that represents a bearer release request/response is also transmitted via an inter-node processing route similar to the above route. When the bearer release response is received, information on the bearer is deleted from the packet processing engine 22, the bearer management section 24, and the PDN/IP address/UE management section 25 by the processor 23.

After bearer configuration, the packet processing engine 22 performs a packet transfer and required packet processing (encapsulation) based on the bearer configuration to establish a given communication, both for the UL and DL. That is, within the node 20, communications are performed on a route from the network interface 21 to the packet processing engine 22, and from the packet processing engine 22 to the network interface 21.

Hereinafter, an example of the operation of the core network node 20 including a local breakout of this example will be explained with reference to FIGS. 12-17. Note that the reference numerals in parentheses attached to the processing numbers represent the order of processing through the above-described components in the core network node 20 also in FIGS. 12-17.

(UL Packet Processing)

Firstly, UL packet processing at the core network node 20 will be described with reference to FIG. 12.

Figure 12:
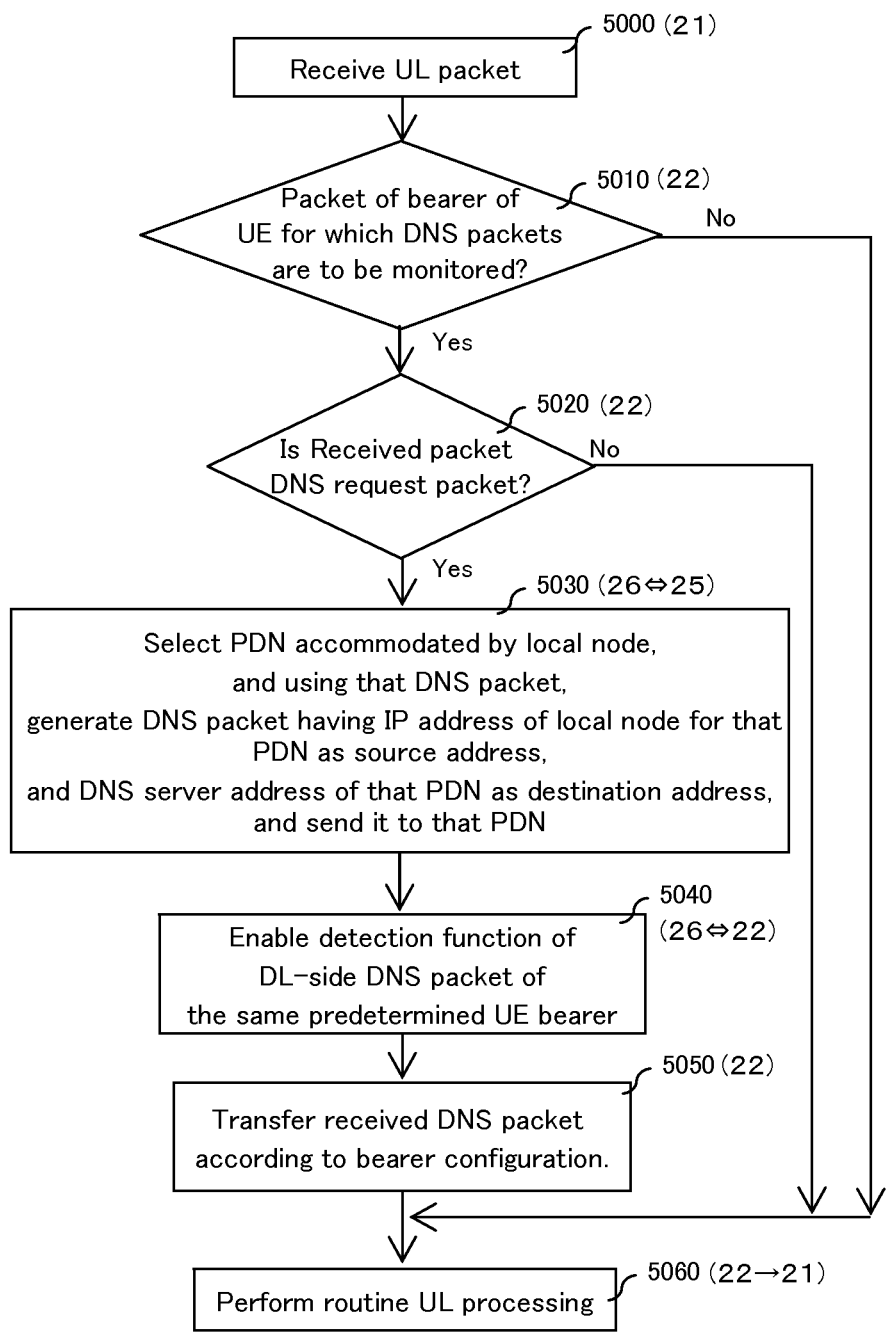
FIG. 12 is a flowchart illustrating one example of the uplink (UL) operation of the core network node depicted in FIG. 11.

As depicted in FIG. 12, when a UL packet sent by the UE 10 is received at the network interface 21 in the node 20 (Processing 5000), the received packet is transferred to the packet processing engine 22.

The packet processing engine 22 checks whether or not the received packet is a packet of the bearer of the UE 10 which are to be monitored (Processing 5010), and if so (Yes in Processing 5010), the packet processing engine 22 further checks whether or not the packet is a DNS request 20A (Processing 5020).

If the packet is a DNS request 20A to be monitored (Yes in Processing 5020), the control policy management section 26 selects a PDN a communication path (bearer) of which is configurable from the local node 20 in cooperation with the PDN/IP address/UE management section 25, (copies) based on the received DNS request 20A, generates a DNS request 20B having the IP address of the local node (vAGW) 20 as a sender address and the IP address of a DNS server 40 (40-1) that performs an address resolution at the selected PDN as a destination address, and sends it via the network interface 21 (Processing 5030). The Processing 5030 corresponds to processing at Steps S2a and S3a in FIG. 6.

The control policy management section 26 then enables a detection function of DL DNS packets on a bearer that is to be monitored, and stores the information (Processing 5040). The packet processing engine 22 transfers the original DNS request 20A via the network interface 21 in accordance with the default bearer configuration (Processing 5050). Note that the control policy management section 26 monitors whether the detection function has been enabled for a certain period of time by means of a monitoring timer (not illustrated).

That is, the network interface 21 includes a function as a reception device that receives the DNS request (first packet data) 20A that is sent for accessing by the UE 10 to the (first) content server. The control policy management section 26 includes a function as a generation device that generates a DNS request (second packet data) 20B specifying the local node 20 as the sender (address) of the DNS request 20A. The packet processing engine 22 and the network interface 21 include functions as transmission devices that respectively send the DNS request 20A to the DNS server 40-0, or the DNS request 20B to the DNS server 40-1.

Thereafter, the packet processing engine 22 performs normal transfer (routing) processing on the received UL packets (Processing 5060). Note that, when the received DNS packet is not a packet of the bearer of the UE 10 which are to be monitored (when No in Processing 5010), or when the packet is a packet to be monitored but is not a DNS request 20A (when No in Processing 5020), normal packet transfer processing is performed on that received packet (Processing 5060).

(DL Packet Processing)

Subsequently, DL packet processing at the core network node 20 will be described with reference to FIG. 13 and FIG. 14.

Figure 13:
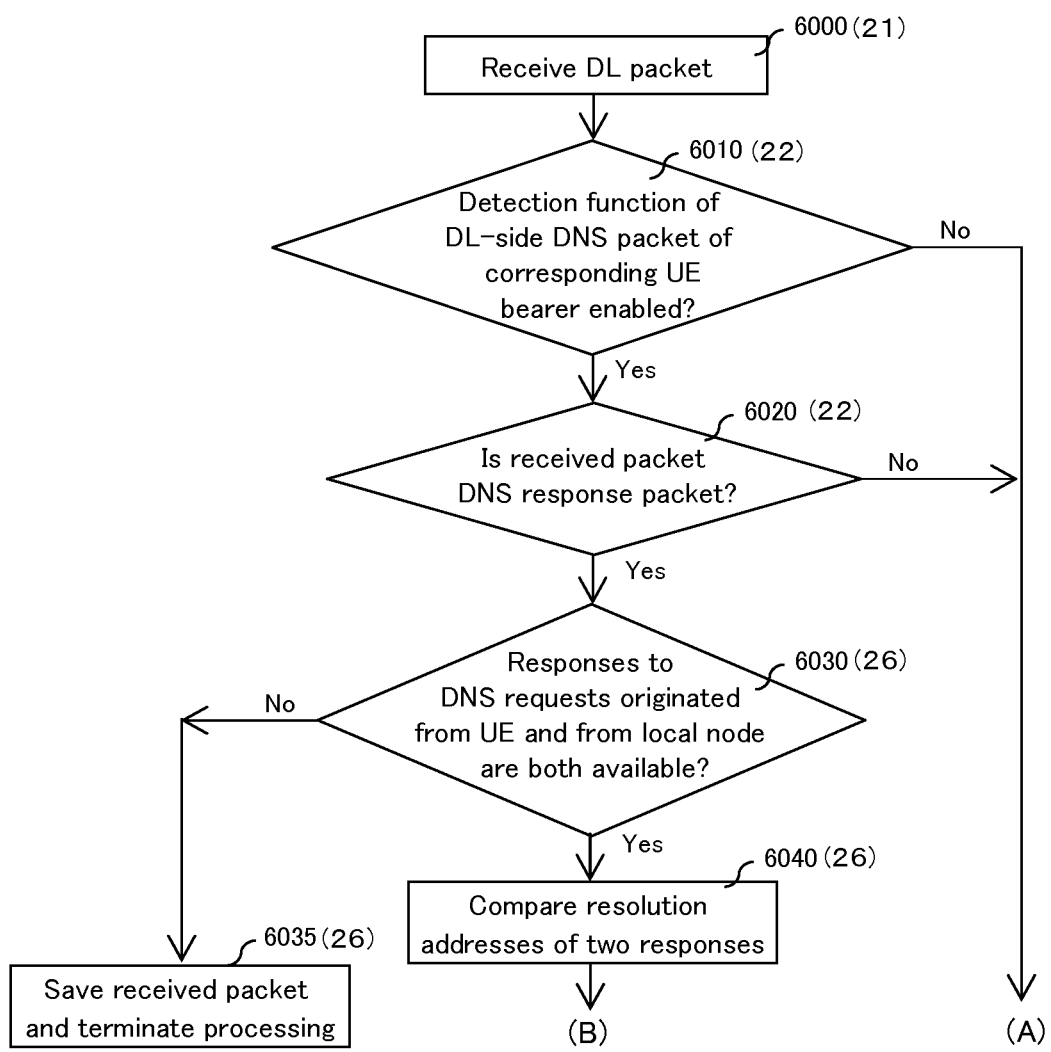
FIG. 13 is a flowchart illustrating one example of the downlink (DL) operation of the core network node depicted in FIG. 11.

As depicted in FIG. 13, when a DL packet is received at the network interface 21 in the node 20 (Processing 6000), the received packet is transferred to the packet processing engine 22.

The packet processing engine 22 checks whether or not the detection function of DL DNS packets of the bearer of the UE 10 for which received packets are to be monitored is enabled, in cooperation with the control policy management section 26 (Processing 6010), if so (Yes in Processing 6010), the packet processing engine 22 further checks whether or not that received packet is a DNS response 20A' or 20B' (Processing 6020).

If the received packet is a DNS response 20A' or 20B' (Yes in Processing 6020), it notifies the control policy management section 26 with the content thereof. The control policy management section 26 checks whether or not contents of both of the DNS response 20A' in response to the DNS request 20A sent by the UE 10, and the DNS response 20B' in response to the DNS request 20B sent by the local node 20 become available within a certain time period (Processing 6030).

If they become available (Yes in Processing 6030), the control policy management section 26 compares address resolution results (IP addresses) of the DNS response 20A' and 20B' (Processing 6040). That is, the control policy management section 26 includes a function as a comparison device that compares the DNS responses 20A' and 20B'.

Figure 14:
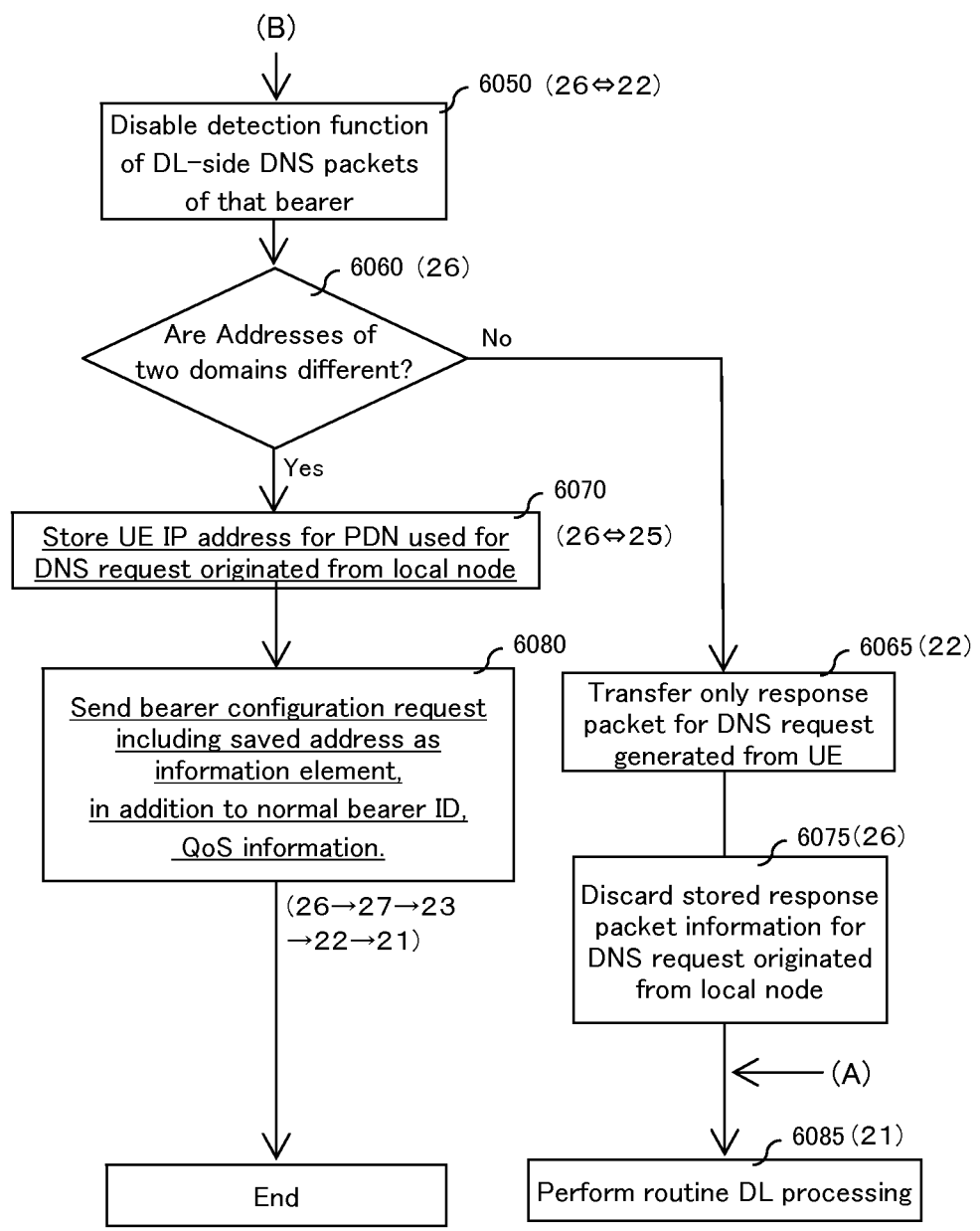
FIG. 14 is a flowchart illustrating one example of the downlink (DL) operation of the core network node depicted in FIG. 11.

In addition, as depicted in FIG. 14, the control policy management section 26 disables the detection function, and reflects the setting to the packet processing engine 22 (Processing 6050).

The control policy management section 26 then checks whether or not address resolution results are different (domains are different) as a result of the comparison of the DNS responses 20A' and 20B' (Processing 6060); if so, it stores the IP address contained in the DNS response 20B' in response to the DNS request 20B that is generated and sent by the local node 20 (stores in the PDN/IP address/UE management section 25) (from Yes route in Processing 6060 to Processing 6070).

Furthermore, the control policy management section 26 generates, in cooperation with the processor 23 and the alternative communication path configuration management section 27, a bearer control message addressed to the UE 10 which indicates bearer configuration request including, in addition to the identification information and QoS information of the normal (default) bearer, the reserved IP address in information elements. The generated bearer configuration request is sent to the UE 10 through the packet processing engine 22 and the network interface 21 (Processing 6080). This Processing 6080 corresponds to the processing at Step S7 in FIG. 6.

That is, the processor 23, the control policy management section 26, and the alternative communication path configuration management section 27 function as a communication path configuration device that, when the above comparison results are different, allocates the resolution address of the DNS response 20B' in response to the DNS request 20B that is sent by the core network node 20 to the UE 10, and configures a communication path between the UE 10 and a content server indicated by resolution address.

Note that, when the detection function is disabled at Processing 6010 in FIG. 13 (in case of No), or when the received packet is not a DNS response 20A' or 20B' at Processing 6020 in FIG. 13 (in case of No), the normal DL packet processing is performed via the network interface 21 and the packet processing engine 22 (Processing 6085 in FIG. 14).

In addition, when either DNS responses 20A' or 20B' does not become available at Processing 6030 in FIG. 13 (in case of No), the control policy management section 26 saves the content of the received DNS response 20A' or 20B' and terminates the processing (Processing 6035).

Furthermore, when the IP addresses (domains) that are compared at Processing 6060 in FIG. 14 match (in case of No), it can be determined that no local breakout is performed. Thus, the control policy management section 26 instructs the packet processing engine 22 to transfer, to the UE 10, the DNS response 20A' in response to the DNS request 20A sent by the UE 10 (to allocate resolution address of the DNS response 20A' to the UE 10).

The packet processing engine 22, in accordance with this instruction, transfers the DNS response 20A' in response to the DNS request 20A sent by the UE 10 to the UE 10 via the network interface 21 (Processing 6065), and discards information on the DNS response 20B' in response to the DNS request 20B that is sent by the local node 20 as a proxy (Processing 6075), and performs the normal DL packet processing via the network interface 21 (Processing 6085).

Figure 15:
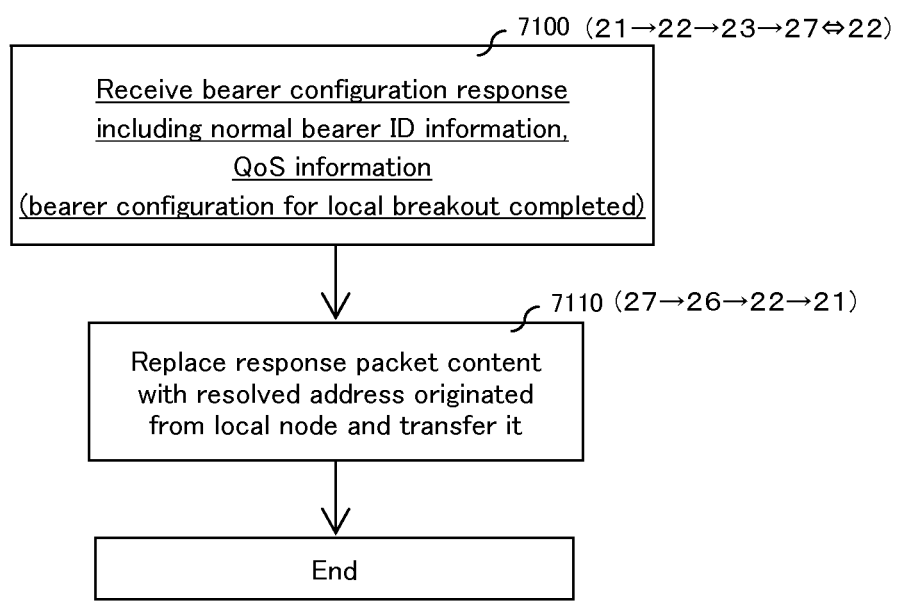
FIG. 15 is a flowchart illustrating one example of the downlink (DL) operation of the core network node depicted in FIG. 11.

In addition, as depicted in FIG. 15, when a bearer control message that represents a bearer configuration response (see Step S8 in FIG. 6, for example) sent by the UE 10 is received at the packet processing engine 22 via the network interface 21 (Processing 7100), that bearer configuration response is transferred to the processor 23.

The processor 23 makes the alternative communication path configuration management section 27 to maintain and manage information elements of the received bearer configuration response, and sets a routing setting in accordance with that information element to the packet processing engine 22.

The packet processing engine 22 then updates, in cooperation with the alternative communication path configuration management section 27, the content of the received bearer configuration response corresponding to the bearer configuration request sent by the UE 10 with the resolved IP address sent by the local node 20, and transfers it to the UE 10 via the network interface 21 (Processing 7110).

Figure 16:
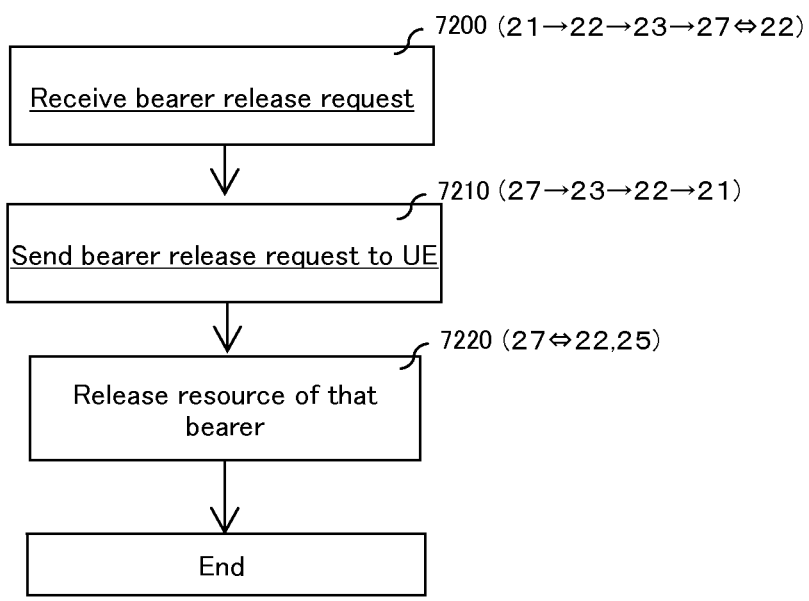
FIG. 16 is a flowchart illustrating one example of the downlink (DL) operation of the core network node depicted in FIG. 11.

In addition, as depicted in FIG. 16, when a bearer control message that represents a bearer release request response (see Step S12 in FIG. 7, for example) sent by the UE 10 is received at the packet processing engine 22 via the network interface 21 (Processing 7200), release request response is transferred to the processor 23.

The processor 23 generates a bearer release response in cooperation with the alternative communication path configuration management section 27, sends it to the UE 10 via the network interface (Processing 7210), and releases the resource of that bearer (Processing 7220). For example, the PDN/IP address/UE management section 25, the control policy management section 26, and the alternative communication path configuration management section 27 delete their own retained data, and release (unset) the routing setting of that bearer for the packet processing engine 22. This release processing corresponds to the processing at Step S13 in FIG. 7 and relating processing, for example.

Figure 17:
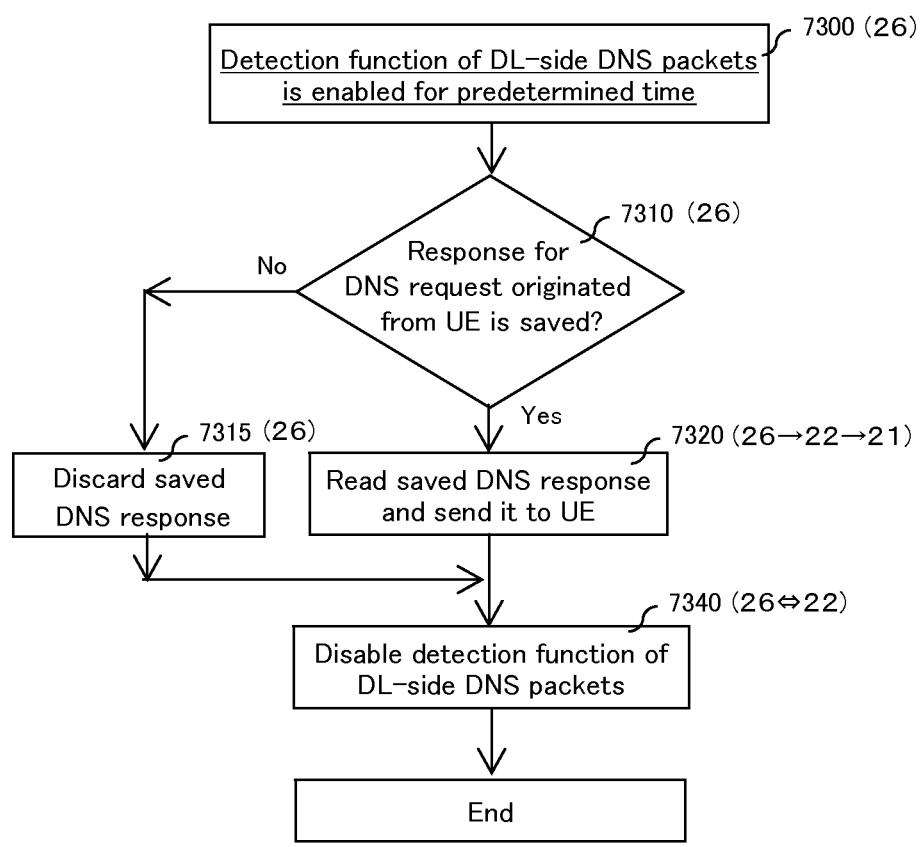
FIG. 17 is a flowchart illustrating one example of the downlink (DL) operation of the core network node depicted in FIG. 11.

Note that, as depicted in FIG. 17, when the control policy management section 26 detects by the monitoring timer that the detection function of DL DNS packets has been enabled for a certain period of time (Processing 7300), it checks whether or not the DNS request 20A corresponding to the DNS response 20A' sent by the UE 10 has been received and stored (Processing 7310).

When it has not been stored (when No in Processing 7310), the control policy management section 26 discards the DNS response 20B' stored at Processing 6035 in FIG. 13 (Processing 7315), and disables the detection function (Processing 7340).

On the other hand, when it has not been stored (when Yes in Processing 7310), the control policy management section 26 reads the stored the DNS response 20A', sends it to the UE 10 via the packet processing engine 22 and the network interface 21 (Processing 7320), and disables the detection function (Processing 7340).

Thus, the core network node 20 can avoid the situation where the detection function is wastefully enabled by waiting to receive the DNS response 20A' and 20B' since they do not become available.

(5) UE

Figure 18:
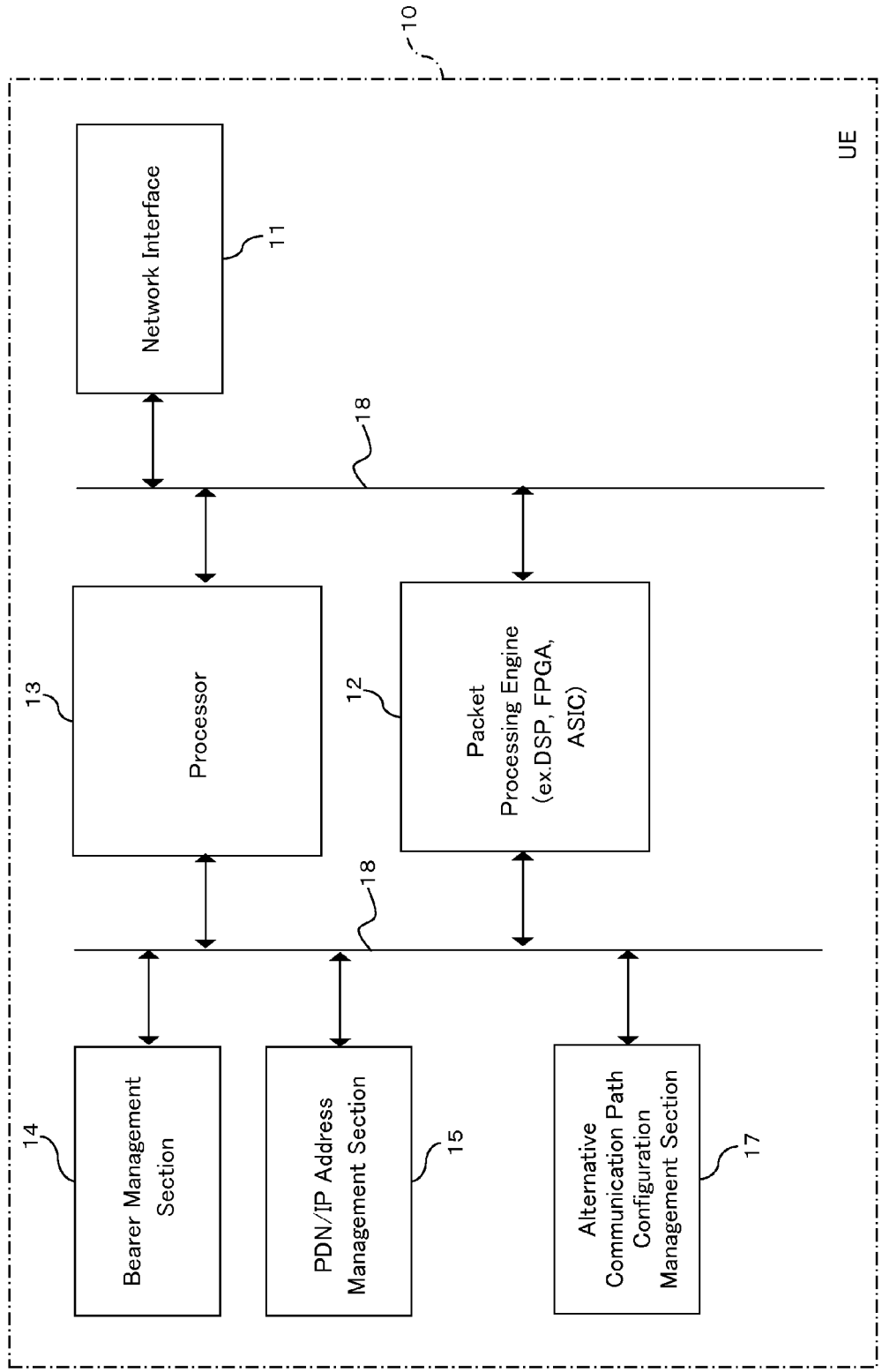
FIG. 18 is a block diagram illustrating an example of the configuration of the UE depicted in FIG. 11.

FIG. 18 is a block diagram illustrating an example of the configuration of the UE 10. The UE 10 depicted in FIG. 18 includes a network interface 11, a packet processing engine 12, a processor 13, a bearer management section 14, a PDN/IP address management section 15, and an alternative communication path configuration management section 17, for example. These components are communicatively connected to each other by a communication bus 18.

The network interface 11 includes a wireless interface, and includes a function to perform transmission and reception of wireless data (packet) with the outside.

The packet processing engine 12 includes a function to identify a bearer, a packet routing function based on bearer configurations, and functions to identify data addressed to the local terminal 10, and to distribute it to appropriate processing sections in the UE 10.

In addition, the packet processing engine 12 also includes a packet routing function based on bearer configurations of local breakout communications, based on data that is maintained and managed by the alternative communication path configuration management section 17 (data on a bearer for local breakout communications as an alternative communication path). The packet processing engine 12 can also be implemented using integrated circuit techniques, such as a DSP, an FPGA, an ASIC, for example.

The bearer management section 14 is adapted to maintain and manage information required for bearer communications.

The PDN/IP address management section 15 is adapted to maintain and manage information on service statuses, such as correspondence between a PDN to which the local terminal 10 is connecting and an IP address used for that PDN connection.

The alternative communication path configuration management section 17 is adapted to maintain and manage control data on an alternative communication path (bearer for a local breakout) that is newly established other than the default communication path.

The processor 13 includes functions to a generate and terminate a bearer control message (such as a bearer configuration or release request) required to configure or release a bearer, to store information required by the bearer management section 14 and the alternative communication path configuration management section 17, and to setup settings on the packet processing engine 12 which is necessary for a bearer communication (including a local breakout communication) based on the information maintained and managed by the management sections 14 and 17.

In the UE 10 that is configured described above, upon configuring a bearer for the default communication path or the like, bearer control messages (bearer configuration request and response) are exchanged with the core network node 20 or 30.

A bearer control message is received by the network interface 11, is transferred to the packet processing engine 12 via the bus 18, is identified as a bearer control message by the packet processing engine 12, and is transferred to the processor 13 via the bus 18.

When the processor 13 analyzes the received bearer control message and identifies a bearer configuration request, it extracts information to configure a bearer (such as a counter node address, bearer identification information) from the bearer configuration request and determines information required by the local station 10 for receiving packet flows on bearer (such as the local node address, bearer identifier).

The processor 13 further generates a bearer configuration response based on the determined information, and makes the bearer management data memory 14 store the extracted and determined information, and sets routing setting on the packet processing engine 12 according to the information. The generated bearer configuration response is transferred to the packet processing engine 12 via the bus 18, is further transferred from the packet processing engine 12 to the network interface 11 via the bus 18, and is sent to the counter node from the network interface 11.

In combination of the attach procedure of the UE 10, the local station 10 itself may generate and send a bearer configuration request.

In this case, the attach processing is processed by the processor 13 and the IP address allocated from the core network node 20 or 30 in the process of the procedure of the attach processing is stored in the PDN/IP address management data memory 15. Alternatively, the processor 13 stores, to the PDN/IP address management section 15, the IP address given to the local station 10 in a separate procedure, and generates a bearer configuration request, together with correspondence information (filter information) to packet identification information (such as an address) between the bearer and the UE 10 based on the information.

This bearer configuration request is also transferred to the packet processing engine 12 via the bus 18, is further transferred from the packet processing engine 12 to the network interface 11 via the bus 18, and sent to the counter node from the network interface 11.

Note that a bearer control message that represents a bearer release request/response is also transmitted via an inter-node processing route similar to the above route. When the bearer release response is received, information on the bearer is deleted from the packet processing engine 12, the bearer management section 14, and the PDN/IP address management section 15 by the processor 13.

After bearer configuration, the packet processing engine 12 performs a packet transfer and required packet processing (encapsulation) based on the bearer configuration to establish a given communication, both for the UL and DL. That is, within the UE 10, communications are performed on a route from the network interface 11 to the packet processing engine 12, and from the packet processing engine 12 to the network interface 11.

Hereinafter, an example of the operation of the UE 10 including a local breakout of this example will be explained with reference to FIGS. 19-21. Note that the reference numerals in parentheses attached to the processing numbers represent the order of processing through the above-described components in the UE 10 also in FIGS. 19-21.

Note that, in the following example, it is assumed that the default communication path has been already established, and the UE 10 generates a DNS request 20A for accessing a certain site (content server) and sends it to the DNS server 40-0. In this case, the DNS request 20A is generated by the processor 13, and sent to the counter node 20 via the packet processing engine 12 and the network interface 11.

That is, the packet processing engine 12 and the network interface 11 function as a transmission device that sends the DNS request 20A that is a first packet data.

Figure 19:
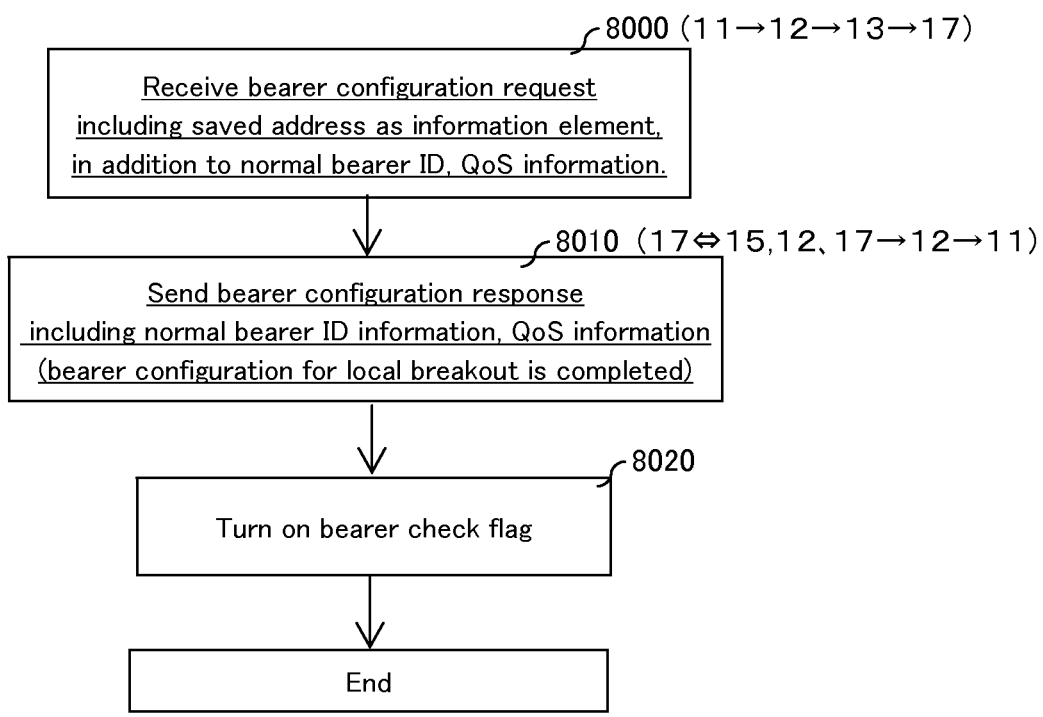
FIG. 19 is a flowchart illustrating the operation of the UE depicted in FIG. 18.

As depicted in FIG. 19, in response to a DL packet sent by the core network node 20 being received at the network interface 11 in the UE 10, that received packet is transferred to the packet processing engine 12 via the bus 18.

The packet processing engine 12 analyzes whether or not the received packet is a bearer control message (bearer configuration request) that includes, in information elements, the identification information and the QoS information of the normal (default) bearer, as well as a resolution address of the DNS request 20B corresponding to the DNS response 20B' sent by the core network node 20 as a proxy (IP address used for a bearer for a local breakout). If the received packet is a bearer configuration request (when the bearer configuration request sent by the counter node 20 at Step S7 in FIG. 6, for example), the packet processing engine 12 passes that information element to the processor 13.

That is, the network interface 11 and the packet processing engine 12 also function as a reception device that receives the resolution address of the DNS response 20B'.

The processor 13 makes the alternative communication path configuration management section 17 maintain and manage information elements of the received bearer configuration request, and sets a routing setting in accordance with the resolution address that is one of the information elements to the packet processing engine 12 (Processing 8000).

The processor 13 then recognizes that a communication path for a local breakout is available by detecting that the IP address previously used by the UE 10 for the default IP access and the resolution address are different, and initiates the bearer setup procedure in cooperation with the alternative communication path configuration management section 17 and The PDN/IP address management section 15.

For example, the processor 13, in cooperation with the alternative communication path configuration management section 17 and The PDN/IP address management section 15, generates a bearer control message (bearer configuration response) including the identification information and the QoS information of the normal (default) bearer as information elements, and sends it to the counter node 20 via the packet processing engine 12 and the network interface 11 (Processing 8010). This Processing 8010 corresponds to the processing at Step S8 in FIG. 6. The configuration of the bearer for the local breakout is completed with the above-described processing.

Thereafter, the alternative communication path configuration management section 17 turns on an internal bearer check flag (Processing 8020), and terminates the processing. Note that the bearer check flag is information that represents the presence or absence of a bearer set for a local breakout.

Figure 20:
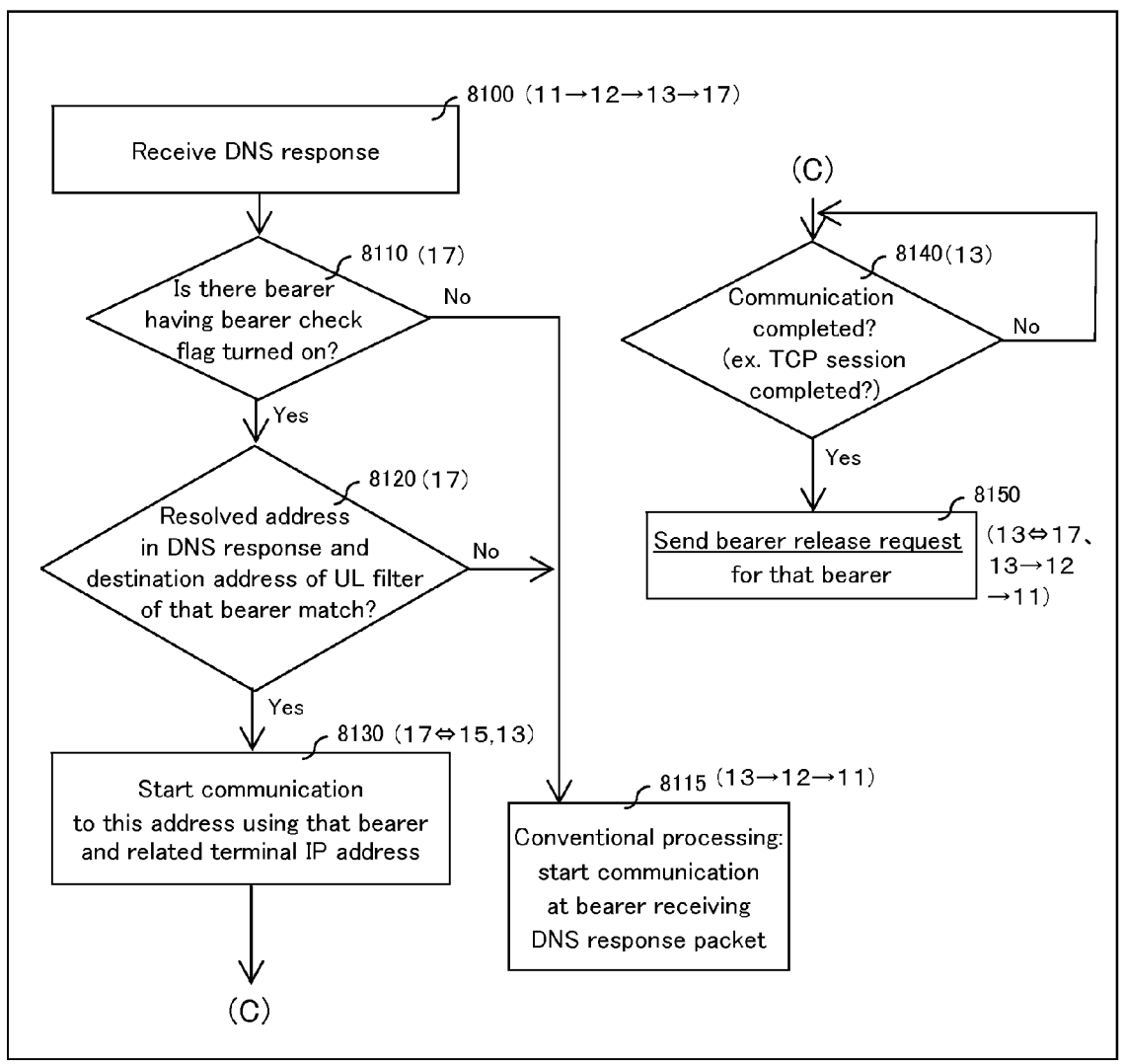
FIG. 20 is a flowchart illustrating the operation of the UE depicted in FIG. 18.

On the other hand, when the DL packet received at the packet processing engine 12 via the network interface 11 is a DNS response (for example, the DNS response sent by the counter node 20 at Step S9 in FIG. 6) as depicted in FIG. 20, its content is passed to the alternative communication path configuration management section 17, and the alternative communication configuration management section 17 checks whether or not there is any bearer having a bearer check flag that is turned on (Processing 8110).

When there is any bearer having a bearer check flag that is turned on (when Yes in Processing 8110), the alternative communication path configuration management section 17 checks whether or not the resolution address of the DNS server 40-1 matches to the destination address in the UL IP filter data on that bearer (bearer for a local breakout) (from the Yes route in Processing 8110 to Processing 8120).

When they matches, the alternative communication path configuration management section 17 initiates, in cooperation with the processor 13 and the PDN/IP address management section 15, a communication (that is, local breakout communication) with the destination address using the IP address related to that bearer (performs required routing setting to the packet processing engine 12) (from the Yes route in Processing 8120 to Processing 8130).

That is, the processor 13, the alternative communication path configuration management section 17, and The PDN/IP address management section 15 function as a communication control device that accesses a content server on a communication path that is configured with the content server indicated by a resolution address by the counter node 20, using the resolution address in the DNS response 20B'.

Thereafter, the processor 13 monitors whether or not the communication (communication session, such as a TCP session) is terminated (No route in Processing 8140). If the communication is terminated, the processor 13, in cooperation with the alternative communication path configuration management section 17, generates a bearer release request for the bearer on which the communication is terminated and sends the bearer release request to the counter node 20 via the packet processing engine 12 and the network interface 11 (from the Yes route in Processing 8140 to Processing 8150). This Processing 8150 corresponds to the processing at Step S12 in FIG. 7.

Figure 21:
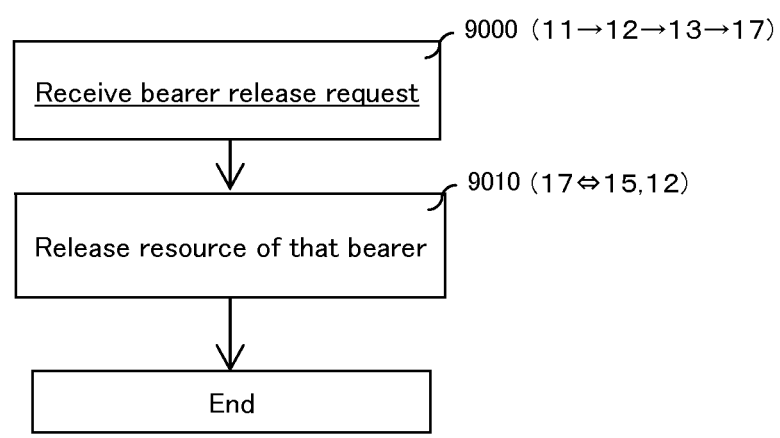
FIG. 21 is a flowchart illustrating the operation of the UE depicted in FIG. 18.

As depicted in FIG. 21, when the bearer release response for that bearer release request is received by the alternative communication path configuration management section 17 through the network interface 11, the packet processing engine 12, and the processor 13 (Processing 9000), the alternative communication path configuration management section 17 performs resource release processing on that bearer (Processing 9010). For example, the alternative communication path configuration management section 17 deletes resource information (IP address or the like) of that bearer retained by alternative communication path configuration management section 17 and The PDN/IP address management section 15, and unsets the setting to the packet processing engine 12.

Note that, in FIG. 20, when there is no bearer having a bearer check flag that is turned on (when No in Processing 8110), or when the resolution IP address and the destination address in the UL IP filter data of the bearer do not match (when No in Processing 8120), the notification is made to the processor 13 and the processor 13 sets required settings to the packet processing engine 12 in order to initiate a communication on the bearer on which the DNS response is received, without performing a local breakout (Processing 8115).

(6) Others

Although the above-described example has been explained in the context in which a point on which a local breakout is performed is the vAGW 20, the point may be a core network node that is the UE access node depicted in FIG. 4 or FIG. 5, for example.

According to the embodiments, a user device can access contents efficiently.

Additionally, or alternatively, a connection (communication path) that facilitates an efficient content access by a user device is easily identified and such a connection is provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A packet communication system, comprising:
    a user device;
    a node that is configured to receive packet data sent by the user device;
    a plurality of content servers for which a communication path is configurable from the node;
    a plurality of address resolution servers that are communicatively connected to the node, and resolve addresses used for accessing the content servers based on a source of received packet data;
    a transfer device that transfers, to a first address resolution server, first packet data sent by the user device for accessing a first content server, the first packet data being a DNS (Domain Name System) request requesting an address corresponding to a URL (Uniform Resource Locator);
    a transmission device that generates second packet data by changing a sender of the first packet data to the node, and sends the second packet data to a second address resolution server, the second packet data being the DNS request;
    a comparison device that compares first and second address resolution results sent back from the first and second address resolution servers for the first and second packet data; and
    a communication path configuration device that, when the first and second address resolution results do not match, allocates the second address resolution result to the user device, and configures a communication path between the user device and a second content server indicated by the second address resolution result.

2. A packet communication method in a packet communication system, the packet communication system comprising a user device, a node that is configured to receive packet data sent by the user device, a plurality of content servers for which a communication path is configurable from the node, and a plurality of address resolution servers that are communicatively connected to the node and that resolve addresses used for accessing the content servers based on a source of received packet data, the packet communication method comprising:
    the node transferring, to a first address resolution server, first packet data sent by the user device for accessing a first content server, and generating second packet data by changing a sender of the first packet data to the node, and sending the second packet data to a second address resolution server, the first packet data being a DNS (Domain Name System) request requesting an address corresponding to a URL (Uniform Resource Locator), the second packet data being the DNS request;
    the node comparing first and second address resolution results sent back from the first and second address resolution servers for the first and second packet data; and
    the node allocating, when the first and second address resolution results do not match, the second address resolution result to the user device, and configuring a communication path between the user device and a second content server indicated by the second address resolution result,
    the user device accessing to the second content server on the communication path using the allocated second address resolution result.

3. The packet communication method in a packet communication system according to claim 2, further comprising:
the node allocating, when the first and second address resolution results match, the first address resolution result to the user device; and
the user device accessing the first content server using the allocated first address resolution result.

4. The packet communication method in a packet communication system according to claim 2, wherein the node performing the allocating by including the second address resolution result in a communication path configuration request that requests the user device to commence a procedure for configuring the communication path.

5. The packet communication method in a packet communication system according to claim 4, further comprising the user device commencing the procedure for configuring the communication path by detecting that the second address resolution result included in the communication path configuration request is different from address information previously used for communication, thereby recognizing that the communication path is available.

6. The packet communication method in a packet communication system according to claim 2, further comprising:
the user device sending a release request for the communication path to the node upon completion of a communication via the communication path; and
the node releasing the configuration of the communication path in response to receiving the release request.

7. The packet communication method in a packet communication system according to claim 2, wherein the node is gateway node of a home packet data network subscribed by the user device.

8. The packet communication method in a packet communication system according to claim 2, wherein the node is a gateway node of a network that is a packet data network other than a home packet data network subscribed by the user device, and is connected to the home packet data network.

9. A node in a packet communication system, the packet communication system comprising a user device, a node that is configured to receive packet data sent by the user device, a plurality of content servers for which a communication path is configurable from the node, and a plurality of address resolution servers that are communicatively connected to the node and that resolve addresses used for accessing the content servers based on a source of received packet data, the node comprising:
a reception device that receives first packet data sent by the user device for accessing a first content server, the first packet data being a DNS (Domain Name System) request requesting an address corresponding to a URL (Uniform Resource Locator);
a generation device that generates second packet data by changing a sender of the first packet data to the node, the second packet data being the DNS request;
a transmission device that sends the first packet data to a first address resolution server, and sends the second packet data to a second address resolution server;
a comparison device that compares first and second address resolution results sent back from the first and second address resolution servers for the first and second packet data; and
a communication path configuration device that, when the first and second address resolution results do not match, allocates the second address resolution result to the user device, and configures a communication path between the user device and a second content server indicated by the second address resolution result.

10. The node in a packet communication system according to claim 9, wherein the communication path configuration device allocates, when the first and second address resolution results match, the first address resolution result to the user device.

11. The node in a packet communication system according to claim 9, wherein the communication path configuration device performs the allocation by including the second address resolution result in a communication path configuration request that requests the user device to commence a procedure for configuring the communication path.

12. The node in a packet communication system according to claim 9, wherein the communication path configuration device releases a configuration of the communication path in response to receiving a release request for the communication path which is sent by the user device due to completion of a communication via the communication path.

13. The node in a packet communication system according to claim 9, wherein the node is gateway node of a home packet data network subscribed by the user device.

14. The node in a packet communication system according to claim 9, wherein the node is a gateway node of a network that is a packet data network other than a home packet data network subscribed by the user device, and is connected to the home packet data network.

15. A user device in a packet communication system, the packet communication system comprising a user device, a node that is configured to receive packet data sent by the user device, a plurality of content servers for which a communication path is configurable from the node, and a plurality of address resolution servers that are communicatively connected to the node and that resolve addresses used for accessing the content servers based on a source of received packet data, the user device comprising:
a transmission device that sends first packet data for accessing to a first content server, the first packet data being a DNS (Domain Name System) request requesting an address corresponding to a URL (Uniform Resource Locator);
a reception device that, when a node in the packet communication system, receiving the first packet data, sends the first packet data to a first address resolution server, and generates second packet data by changing a sender of the first packet data to the node and sends the second packet data to a second address resolution server, receives a second address resolution result that is sent from the node, when first and second address resolution result sent back to the node from the first and second address resolution servers do not match, the second packet data being the DNS request; and
a communication control device that accesses to the second content server on a communication path configured by the node with a second content server indicated by the second address resolution result using the second address resolution result.

16. The user device according to claim 15, wherein the communication control device, when the second address resolution result is included in a communication path configuration request received from the node which requests commencement of a procedure for configuring the communication path, detects that the second address resolution result is different from address information previously used for communication, thereby recognizing that the communication path is available, and commences a procedure for configuring the communication path.

17. The user device according to claim 15, wherein the user communication control device sends a release request for the communication path to the node upon completion of a communication via the communication path.

18. The user device according to claim 17, wherein the communication control device releases a communication resource reserved for the communication path in response to receiving a response to the release request.

* * * * *